United States Patent
Wang

(10) Patent No.: US 9,356,751 B2
(45) Date of Patent: May 31, 2016

(54) DATA TRANSMISSION METHOD, BASE STATION, AND USER EQUIPMENT

(71) Applicant: Huawei Device Co., Ltd., Shenzhen, Guangdong (CN)

(72) Inventor: Jian Wang, Beijing (CN)

(73) Assignee: Huawei Device Co., Ltd., Shenzhen (CN)

(*) Notice: Subject to any disclaimer, the term of this patent is extended or adjusted under 35 U.S.C. 154(b) by 0 days.

(21) Appl. No.: 14/308,306

(22) Filed: Jun. 18, 2014

(65) Prior Publication Data

US 2014/0301356 A1    Oct. 9, 2014

Related U.S. Application Data

(63) Continuation of application No. PCT/CN2013/072999, filed on Mar. 21, 2013.

(51) Int. Cl.
*H04L 5/00* (2006.01)
*H04L 1/00* (2006.01)

(52) U.S. Cl.
CPC ............ *H04L 5/0046* (2013.01); *H04L 1/0003* (2013.01); *H04L 1/0007* (2013.01); *H04L 1/0009* (2013.01); *H04L 1/0015* (2013.01); *H04L 5/003* (2013.01)

(58) Field of Classification Search
CPC ... H04L 5/0005; H04L 5/0046; H04L 1/0009; H04L 1/0003; H04L 5/003
See application file for complete search history.

(56) References Cited

U.S. PATENT DOCUMENTS

| | | |
|---|---|---|
| 2010/0103920 A1 | 4/2010 | Damnjanovic et al. |
| 2010/0195614 A1* | 8/2010 | Nimbalker ........ H04W 72/1289 370/330 |
| 2012/0177137 A1 | 7/2012 | Cheng et al. |

(Continued)

FOREIGN PATENT DOCUMENTS

| | | |
|---|---|---|
| CN | 102106176 A | 6/2011 |
| CN | 102124693 A | 7/2011 |

(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 11)," 3GPP TS 36.211, V11.0.0, pp. 1-106, 3rd Generation Partnership Project, Valbonne, France (Sep. 2012).

(Continued)

*Primary Examiner* — Brian D Nguyen
(74) *Attorney, Agent, or Firm* — Leydig, Voit & Mayer, Ltd.

(57) ABSTRACT

Embodiments of the present invention provide a data transmission method, a base station, and a user equipment. The data transmission method includes: determining, by a base station, a modulation and coding level and a time-frequency resource, and determining, in a first or second modulation and transport block size index table, a TBS index and a modulation mode, where a second TBS index is not smaller than a first TBS index; and sending service data and a system scheduling control signal to a user equipment by adopting the selected TBS. In this way, the base station can select a larger TBS to achieve a higher coding rate and increase a system throughput.

28 Claims, 3 Drawing Sheets

(56) References Cited

U.S. PATENT DOCUMENTS

| | | | |
|---|---|---|---|
| 2012/0201225 A1 | 8/2012 | Jung et al. | |
| 2012/0275403 A1* | 11/2012 | Zhang | H04B 7/0404 370/329 |
| 2012/0320805 A1 | 12/2012 | Yang et al. | |
| 2012/0320816 A1* | 12/2012 | Kim | H04L 5/0037 370/315 |
| 2013/0003598 A1* | 1/2013 | Tanaka | H04W 24/08 370/253 |
| 2013/0182653 A1* | 7/2013 | Earnshaw | H04L 1/1822 370/329 |
| 2013/0310092 A1* | 11/2013 | Tabet | H04L 1/0003 455/501 |
| 2013/0315153 A1* | 11/2013 | Sebeni | H04L 1/0001 370/329 |
| 2013/0343290 A1* | 12/2013 | Ren | H04L 1/0003 370/329 |
| 2015/0200746 A1 | 7/2015 | Pan et al. | |

FOREIGN PATENT DOCUMENTS

| | | |
|---|---|---|
| CN | 102577512 A | 7/2012 |
| EP | 2315369 A1 | 7/2009 |
| EP | 2315369 A1 | 4/2011 |
| EP | 2879427 A1 | 6/2015 |
| KR | 20110044269 A | 4/2011 |
| KR | 20110074786 A | 7/2011 |

OTHER PUBLICATIONS

"$3^{rd}$ Generation Partnership Project; Technical Specification Group Radio Access Network; Evolved Universal Terrestrial Radio Access (E-UTRA); Multiplexing and channel coding (Release 11)," 3GPP TS 36.212, V11.0.0, pp. 1-79, $3^{rd}$ Generation Partnership Project, Valbonne, France (Sep. 2012).

"$3^{rd}$ Generation Partnership Project; Technical Specification Group Radio Access Network; Evolved Universal Terrestrial Radio Access (E-UTRA); Physical layer procedures (Release 11)," 3GPP TS 36.213, V11.0.0, pp. 1-143, $3^{rd}$ Generation Partnership Project, Valbonne, France (Sep. 2012).

"DCI Format for Semi-persistent Scheduling," R1-083602, 3GPP TSG RAN WG1 54#bis, Prague, Czech Republic, $3^{rd}$ Generation Partnership Project, Valbonne, France (Sep. 29-Oct. 3, 2008).

"$3^{rd}$ Generation Partnership Project; Technical Specification Group Radio Access Network; Evolved Universal Terrestrial Radio Access(E-UTRA); Physical Layer Procedures(Release 8)," 3GPP TS 36.213, V8.3.0, pp. 1-47, $3^{rd}$ Generation Partnership Project, Valbonne, France (May 2008).

"$3^{rd}$ Generation Partnership Project; Technical Specification Group Radio Access Network; Evolved Universal Terrestrial Radio Access (E-UTRA); Physical layer procedures (Release 11)," 3GPP TS 36.213, V11.2.0, pp. 1-173, $3^{rd}$ Generation Partnership Project, Valbonne, France (Feb. 2013).

* cited by examiner

DATA TRANSMISSION METHOD, BASE STATION, AND USER EQUIPMENT

CROSS-REFERENCE TO RELATED APPLICATIONS

This application is a continuation of International Patent Application No. PCT/CN2013/072999, filed on Mar. 21, 2013, which is hereby incorporated by reference in its entirety.

TECHNICAL FIELD

Embodiments of the present invention relates to communications technologies, and in particular, to a data transmission method, a base station, and a user equipment.

BACKGROUND

In Long-Term Evolution Release 8 (LTE REL.8 for short) to LTE REL.11 systems, a state of a channel from a base station to a user equipment (UE for short) determines a throughput from the base station to the UE. In a relatively good channel state, the base station may transmit data to the UE by adopting a relatively high modulation and coding (MCS for short) level, the throughput of the system is also relatively high. In a relatively poor channel state, to control a bit error rate in a data transmission process, the base station may transmit data to the UE by adopting a relatively low MCS level, and the base station determines a coding rate and an MCS level which are adopted to transmit the data to the UE on this channel according to the channel state fed back by the UE. To achieve a purpose of transmitting the data to the UE at this coding rate, the base station needs to determine a size of a transport block that delivered service data needs to occupy. When determining the size of the transport block, the base station generally determines, in a transport block size table (TBS table for short) according to the determined MCS level and a frequency resource scheduled by the system, the size of the transport block used for bearing service data delivered to the UE by the base station.

In the prior art, for the LTE REL.12, the base station transmits data to the UE by adopting a transport block determined according to the existing TBS table. However, a system overhead of the LTE REL.12 system becomes smaller in comparison with that of the LTE REL.8 to LTE REL.11 systems, which results in a decrease of an actual effective coding rate in the transmission process, thereby affecting a throughput of the LTE REL.12 system.

SUMMARY

Embodiments of the present invention are intended to provide a data transmission method, a base station, and a user equipment, so as to solve problems of a decreased effective coding rate and an affected system throughput, caused by transmitting data to the UE by the base station by using a transport block determined according to an existing TBS table.

According to a first aspect, an embodiment of the present invention provides a data transmission method, including:
determining, by a base station, a modulation and coding level;
determining, by the base station in a first modulation and transport block size index table, a first transport block size TBS index and a first modulation mode that are corresponding to the modulation and coding level, or determining, in a second modulation and transport block size index table, a second TBS index and a second modulation mode that are corresponding to the modulation and coding level, where the second TBS index is not smaller than the first TBS index;
determining, by the base station, a time-frequency resource, and determining, according to the time-frequency resource, a quantity of physical resource block pairs;
selecting, by the base station in a transport block size table, a transport block size TBS corresponding to the quantity of physical resource blocks and corresponding to the determined first TBS index or second TBS index;
sending, by the base station, service data to a user equipment by adopting the selected TBS; and
sending, by the base station, a system scheduling control signal to the user equipment, where the system scheduling control signal includes the modulation and coding level and the time-frequency resource.

With reference to the first aspect, in a first possible implementation manner of the first aspect, the determining, by the base station in a first modulation and transport block size index table, a first transport block size TBS index and a first modulation mode that are corresponding to the modulation and coding level, or determining, in a second modulation and transport block size index table, a second TBS index and a second modulation mode that are corresponding to the modulation and coding level includes:
according to a system configuration parameter or a system overhead size, determining, by the base station in the first modulation and transport block size index table, the first transport block size TBS index and the first modulation mode that are corresponding to the modulation and coding level, or determining, in the second modulation and transport block size index table, the second TBS index and the second modulation mode that are corresponding to the modulation and coding level.

With reference to the first aspect or the first possible implementation manner of the first aspect, in a second possible implementation manner of the first aspect, the method further includes:
sending, by the base station, a high-layer signaling message to the user equipment, where the high-layer signaling message carries indication information of a selection to determine, in the first modulation and transport block size index table, the first transport block size TBS index and the first modulation mode that are corresponding to the modulation and coding level, or determine, in the second modulation and transport block size index table, the second TBS index and the second modulation mode that are corresponding to the modulation and coding level.

With reference to the first aspect or the first possible implementation manner of the first aspect, in a third possible implementation manner of the first aspect, the method further includes:
sending, by the base station, a downlink control message to the user equipment, where the downlink control message carries indication information of a selection to determine, in the first modulation and transport block size index table, the first transport block size TBS index and the first modulation mode that are corresponding to the modulation and coding level, or determine, in the second modulation and transport block size index table, the second TBS index and the second modulation mode that are corresponding to the modulation and coding level.

With reference to the first aspect, or any one possible implementation manner of the first possible implementation manner of the first aspect, the second possible implementation manner of the first aspect, and the third possible implementation manner of the first aspect, in a fourth possible implementation manner of the first aspect, the transport block size table includes a layer 1 data transport block size table in Long Term Evolution Release 8 LTE REL.8.

With reference to the first aspect, or any one possible implementation manner of the first possible implementation manner of the first aspect, the second possible implementation manner of the first aspect, the third possible implementation manner of the first aspect, and the fourth possible implementation manner of the first aspect, in a fifth implementation manner of the first aspect, the first modulation and transport block size index table is a modulation and transport block size index table in LTE REL.8.

With reference to the fifth possible implementation manner of the first aspect, in a sixth possible implementation manner of the first aspect, for the same modulation and coding level, if the second TBS index in the second modulation and transport block size index table is larger than the first TBS index in the first modulation and transport block size index table, a modulation order of the second modulation mode corresponding to the second TBS index is lower than a modulation order of the first modulation mode corresponding to the first TBS index.

According to a second aspect, an embodiment of the present invention provides a data transmission method, including:

receiving, by a user equipment, a system scheduling control signal sent by a base station, where the system scheduling control signal includes a modulation and coding level and a time-frequency resource;

determining, by the user equipment in a first modulation and transport block size index table, a first transport block size TBS index and a first modulation mode that are corresponding to the modulation and coding level, or determining, in a second modulation and transport block size index table, a second TBS index and a second modulation mode that are corresponding to the modulation and coding level, where the second TBS index is not smaller than the first TBS index;

determining, by the user equipment, a quantity of physical resource block pairs according to the time-frequency resource; and selecting, by the user equipment in a transport block size table, a transport block size TBS corresponding to the quantity of physical resource pairs and corresponding to the determined first TBS index or second TBS index, and receiving, by adopting the selected TBS, service data sent by the base station.

With reference to the second aspect, in a first possible implementation manner of the second aspect, the determining, by the user equipment in a first modulation and transport block size index table, a first transport block size TBS index and a first modulation mode that are corresponding to the modulation and coding level, or determining, in a second modulation and transport block size index table, a second TBS index and a second modulation mode that are corresponding to the modulation and coding level includes:

according to a system configuration parameter or a system overhead size, determining, by the user equipment in the first modulation and transport block size index table, the first transport block size TBS index and the first modulation mode that are corresponding to the modulation and coding level, or determining, in the second modulation and transport block size index table, the second TBS index and the second modulation mode that are corresponding to the modulation and coding level.

With reference to the second aspect or a first possible implementation manner of the second aspect, in a second possible implementation manner of the second aspect, the method further includes:

receiving, by the user equipment, a high-layer signaling message sent by the base station, where the high-layer signaling message carries indication information of a selection to determine, in the first modulation and transport block size index table, the first transport block size TBS index and the first modulation mode that are corresponding to the modulation and coding level, or determine, in the second modulation and transport block size index table, the second TBS index and the second modulation mode that are corresponding to the modulation and coding level.

With reference to the second aspect or the first possible implementation manner of the second aspect, in a third possible implementation manner of the second aspect, the method further includes:

receiving, by the user equipment, a downlink control message sent by the base station, where the downlink control message carries indication information of a selection to determine, in the first modulation and transport block size index table, the first transport block size TBS index and the first modulation mode that are corresponding to the modulation and coding level, or determine, in the second modulation and transport block size index table, the second TBS index and the second modulation mode that are corresponding to the modulation and coding level.

With reference to the second aspect, or any one possible implementation manner of the first possible implementation manner of the second aspect, the second possible implementation manner of the second aspect, and the third possible implementation manner of the second aspect, in a fourth possible implementation manner of the second aspect, the transport block size table includes a layer 1 data transport block size table in the Long Term Evolution Release 8 LTE REL.8.

With reference to the second aspect, or any one possible implementation manner of the first possible implementation manner of the second aspect, the second possible implementation manner of the second aspect, the third possible implementation manner of the second aspect, and the fourth possible implementation manner of the second aspect, in a fifth implementation manner of the second aspect, the first modulation and transport block size index table is a modulation and transport block size index table in LTE REL.8.

With reference to the fifth possible implementation manner of the second aspect, in a sixth possible implementation manner of the second aspect, for the same modulation and coding level, if the second TBS index in the second modulation and transport block size index table is larger than the first TBS index in the first modulation and transport block size index table, a modulation order of the second modulation mode corresponding to the second TBS index is lower than a modulation order of the first modulation mode corresponding to the first TBS index.

According to a third aspect, an embodiment of the present invention provides a base station, including:

a processor, configured to determine a modulation and coding level; determine, in a first modulation and transport block size index table, a first transport block size TBS index and a first modulation mode that are corresponding to the modulation and coding level, or determine, in a second modulation and transport block size index table, a second TBS index and a second modulation mode that are corresponding to the modulation and coding level, where the second TBS index is not smaller than the first TBS index; and determine a time-frequency resource and determine a quantity of physical resource block pairs according to the time-frequency resource;

where the processor is further configured to select, in a transport block size table, a transport block size TBS corresponding to the quantity of physical resource block pairs and corresponding to the first TBS index or second TBS index; and a sender, configured to send service data to a user equipment by adopting the selected TBS, and send a system scheduling control signal to the user equipment, where the system scheduling control signal includes the modulation and control level and the time-frequency resource.

With reference to the third aspect, in a first possible implementation manner of the third aspect, the processor is further configured to, according to a system configuration parameter or a system overhead size, determine, in the first modulation and transport block size index table, the first transport block size TBS index and the first modulation mode that are corresponding to the modulation and coding level, or determine, in the second modulation and transport block size index table, the second TBS index and the second modulation mode that are corresponding to the modulation and coding level.

With reference to the third aspect or the first possible implementation manner of the third aspect, in a second possible implementation manner of the third aspect, the sender is further configured to send a high-layer signaling message to the user equipment, where the high-layer signaling message carries indication information of a selection to determine, in the first modulation and transport block size index table, the first transport block size TBS index and the first modulation mode that are corresponding to the modulation and coding level, or determine, in the second modulation and transport block size index table, the second TBS index and the second modulation mode that are corresponding to the modulation and coding level.

With reference to the third aspect or the first possible implementation manner of the third aspect, in a third possible implementation manner of the third aspect, the sender is further configured to send a downlink control message to the user equipment, where the downlink control message carries indication information of a selection to determine, in the first modulation and transport block size index table, the first transport block size TBS index and the first modulation mode that are corresponding to the modulation and coding level, or determine, in the second modulation and transport block size index table, the second TBS index and the second modulation mode that are corresponding to the modulation and coding level.

With reference to the third aspect, or any one possible implementation manner of the first possible implementation manner of the third aspect, the second possible implementation manner of the third aspect, and the third possible implementation manner of the third aspect, in a fourth possible implementation manner of the third aspect, the transport block size table includes a layer 1 data transport block size table in Long Term Evolution Release 8 LTE REL.8.

With reference to the third aspect, and any one possible implementation manner of the first possible implementation manner of the third aspect, the second possible implementation manner of the third aspect, the third possible implementation manner of the third aspect, and the fourth possible implementation manner of the third aspect, in a fifth implementation manner of the third aspect, the first modulation and transport block size index table is a modulation and transport block size index table in LTE REL.8.

With reference to the fifth possible implementation manner of the third aspect, in a sixth possible implementation manner of the third aspect, for the same modulation and coding level, if the second TBS index in the second modulation and transport block size index table is larger than the first TBS index in the first modulation and transport block size index table, a modulation order of the second modulation mode corresponding to the second TBS index is lower than a modulation order of the first modulation mode corresponding to the first TBS index.

According to a fourth aspect, an embodiment of the present invention provides a user equipment, including:

a receiver, configured to receive a system scheduling control signal sent by a base station, where the system scheduling control signal includes a modulation and coding level and a time-frequency resource; and a processor, configured to determine, in a first modulation and transport block size index table, a first transport block size TBS index and a first modulation mode that are corresponding to the modulation and coding level, or determine, in a second modulation and transport block size index table, a second TBS index and a second modulation mode that are corresponding to the modulation and coding level, where the second TBS index is not smaller than the first TBS index; and determine a quantity of physical resource block pairs according to the time-frequency resource;

where the processor is further configured to select, in a transport block size table, a transport block size TBS corresponding to the quantity of physical resource blocks and corresponding to the determined first TBS index or second TBS index; and the receiver is further configured to send service data to the user equipment by adopting the selected TBS.

With reference to the fourth aspect, in a first possible implementation manner of the fourth aspect, the processor is further configured to, according to a system configuration parameter or a system overhead size, determine, in the first modulation and transport block size index table, the first transport block size TBS index and the first modulation mode that are corresponding to the modulation and coding level, or determine, in the second modulation and transport block size index table, the second TBS index and the second modulation mode that are corresponding to the modulation and coding level.

With reference to the fourth aspect or the first possible implementation manner of the fourth aspect, in a second possible implementation manner of the fourth aspect, the receiver is further configured to receive a high-layer signaling message sent by the base station, where the high-layer signaling message carries indication information of a selection to determine, in the first modulation and transport block size index table, the first transport block size TBS index and the first modulation mode that are corresponding to the modulation and coding level, or determine, in the second modulation and transport block size index table, the second TBS index and the second modulation mode that are corresponding to the modulation and coding level.

With reference to the fourth aspect or the first possible implementation manner of the fourth aspect, in a third possible implementation manner of the fourth aspect, the receiver is further configured to receive a downlink control message sent by the base station, where the downlink control message carries indication information of a selection to determine, in the first modulation and transport block size index table, the first transport block size TBS index and the first modulation mode that are corresponding to the modulation and coding level, or determine, in the second modulation and transport block size index table, the second TBS index and the second modulation mode that are corresponding to the modulation and coding level.

With reference to the fourth aspect, or any one possible implementation manner of the first possible implementation manner of the fourth aspect, the second possible implementation manner of the fourth aspect, and the third possible implementation manner of the fourth aspect, in a fourth possible implementation manner of the fourth aspect, the transport block size table includes a layer 1 data transport block size table in Long Term Evolution Release 8 LTE REL.8.

With reference to the fourth aspect, and any one possible implementation manner of the first possible implementation manner of the fourth aspect, the second possible implementation manner of the fourth aspect, the third possible implementation manner of the fourth aspect, and the fourth possible implementation manner of the fourth aspect, in a fifth implementation manner of the fourth aspect, the first modulation and transport block size index table is a modulation and transport block size index table in LTE REL.8.

With reference to the fifth possible implementation manner of the fourth aspect, in a sixth possible implementation manner of the fourth aspect, for the same modulation and coding level, if the second TBS index in the second modulation and transport block size index table is larger than the first TBS index in the first modulation and transport block size index table, a modulation order of the second modulation mode corresponding to the second TBS index is lower than a modulation order of the first modulation mode corresponding to the first TBS index.

According to the data transmission method, the base station, and the user equipment provided in the embodiments, a base station determines a modulation and coding level; determines, in a first modulation and transport block size index table, a first transport block size TBS index and a first modulation mode that are corresponding to the modulation and coding level, or determines, in a second modulation and transport block size index table, a second TBS index and a second modulation mode that are corresponding to the modulation and coding level, where the second TBS index is not smaller than the first TBS index; determines a time-frequency resource, and determines, according to the time-frequency resource, a quantity of physical resource block pairs; selects, in a transport block size table, a transport block size TBS corresponding to the quantity of physical resource blocks and corresponding to the determined first TBS index or second TBS index; sends service data to the user equipment by adopting the selected TBS; and sends a system scheduling control signal to the user equipment, where the system scheduling control signal includes the modulation and coding level and the time-frequency resource. In this way, the base station and the user equipment can select a larger TBS corresponding to the modulation and coding level so as to achieve a higher coding rate and increase a system throughout.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the present invention clearer, the following clearly describes the technical solutions in the present invention with reference to the accompanying drawings in the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 1:
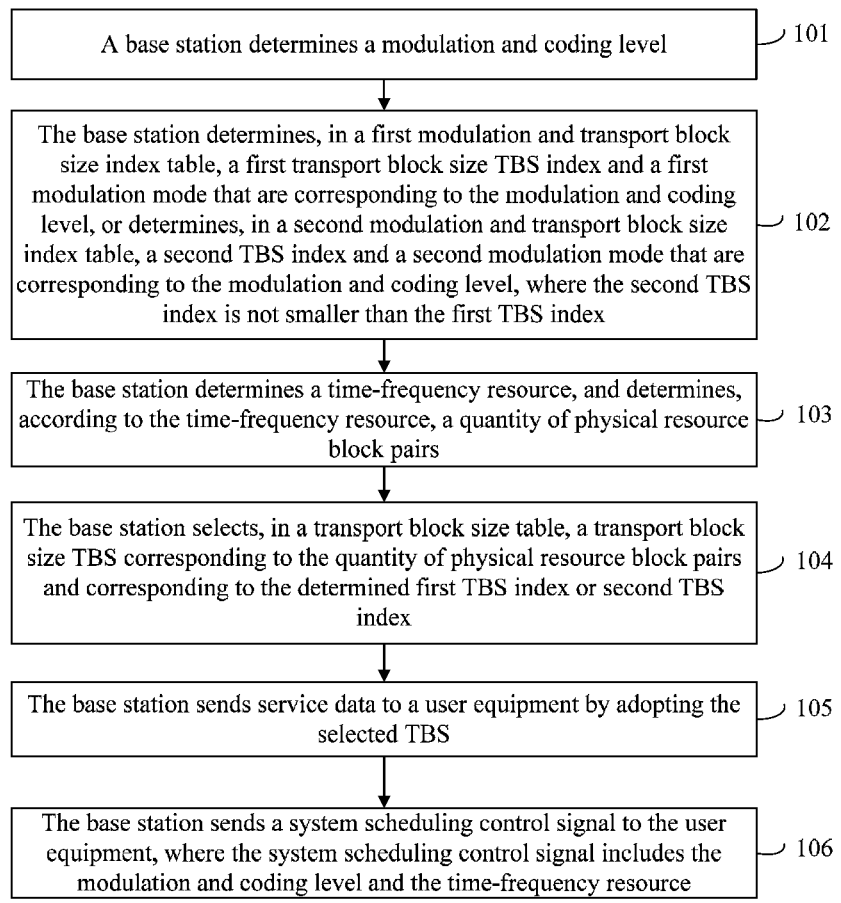
FIG. 1 is a method flowchart of a first embodiment of a data transmission method according to the present invention.

FIG. 1 is a method flowchart of a first embodiment of a data transmission method according to the present invention. As shown in FIG. 1, the data transmission method in this embodiment includes:

101. A base station determines a modulation and coding level.

When sending service data to a user equipment (UE for short), a base station needs to determine a modulation and coding level (MCS Level for short), so that the base station codes the service data to be transmitted according to the determined MCS Level. Specifically, the base station may determine the MCS Level according to a channel state reported by the UE. When the channel state of a communication channel between the base station and the UE is relatively good, the base station may determine a relatively high MCS Level as a modulation and coding level to code the service data to be transmitted; and when the channel state of the communication channel between the base station and the UE is relatively poor, the base station may determine a relatively low MCS Level as a modulation and coding level to code the service data to be transmitted.

In this embodiment, for example, the MCS Level determined by the base station is 10.

102. The base station determines, in a first modulation and transport block size index table, a first transport block size TBS index and a first modulation mode that are corresponding to the modulation and coding level, or determines, in a second modulation and transport block size index table, a second TBS index and a second modulation mode that are corresponding to the modulation and coding level, where the second TBS index is not smaller than the first TBS index.

For example, the base station determines, according to system configuration information or a high-layer signaling indication and in the first modulation and transport block size index table, that a value of the first TBS index corresponding to the modulation and coding level 10 is 9 and a value of a first modulation order is 4, where the value of the modulation order being 4 may indicate that the modulation mode is 16QAM.

For another example, the base station determines, according to system configuration information or a high-layer signaling indication and in the second modulation and transport block size index table, that a value of the second TBS index corresponding to the modulation and coding level 10 is 10 and a value of a second modulation order is 2, where the value of the second TBS index is not smaller than the value of the first TBS index determined in the first modulation and transport block size index table, so that the base station sends the service data to the UE by adopting the TBS determined by the value of the second TBS index which is not smaller than the value of the first TBS index, which can increase a coding rate.

The value of the modulation order being 2 may indicate that the modulation mode is QPSK. A value of a modulation order corresponding to another modulation and coding level in the first modulation and transport block size index table or the second modulation and transport block size index table may also be 6, where the value of the modulation order being 6 may indicate that the modulation mode is 64QAM.

103. The base station determines a time-frequency resource, and determines, according to the time-frequency resource, a quantity of physical resource block pairs.

For example, in a Long Term Evolution Release 12 LTE REL.12 system, a time-frequency resource may be scheduled for data transmission according to a current time-frequency resource availability status. The base station determines, according to the determined time-frequency resource, the quantity of physical resource block pairs (PRB Pair for short) for the base station to transmit the service data to the UE. For example, the quantity of PRB Pairs determined by the base station is 8, and the base station bears service data on these eight PRB Pairs.

104. The base station selects, in a transport block size table, a transport block size TBS corresponding to the quantity of physical resource block pairs and corresponding to the determined first TBS index or second TBS index.

For example, the base station may select, in a layer 1 data transport block size table of LTE REL.8, a transport block size TBS 1256 corresponding to the quantity of physical resource block pairs, 8, determined in 103 and corresponding to the first TBS index 9 determined in 102.

For another example, the base station may select, in a layer 1 data transport block size table of LTE REL.8, a transport block size TBS 1384 corresponding to the quantity of physical resource block pairs, 8, determined in 103 and corresponding to the second TBS index 10 determined in 102.

105. The base station sends service data to the user equipment by adopting the selected TBS.

The base station modulates, according to the modulation mode determined in 102, the service data to 1256 data bits selected in 104, and performs coding by adopting the 16QAM modulation mode corresponding to the first modulation mode 4; or, the base station modulates, according to the modulation mode determined in 102, the service data to 1384 data bits selected in 104, and performs coding by adopting the 16QAM modulation mode corresponding to the first modulation mode 2.

106. The base station sends a system scheduling control signal to the user equipment, where the system scheduling control signal includes the modulation and coding level and the time-frequency resource.

The base station sends, to the UE, a system scheduling control signal that includes the MCS Level and the time-frequency resource that are determined by the base station, so that the UE can correctly receive, according to the MCS Level and the time-frequency resource, the service data sent to it by the base station.

According to the data transmission method provided in this embodiment, a base station determines a modulation and coding level; determines, in a first modulation and transport block size index table, a first transport block size TBS index and a first modulation mode that are corresponding to the modulation and coding level, or determines, in a second modulation and transport block size index table, a second TBS index and a second modulation mode that are corresponding to the modulation and coding level, where the second TBS index is not smaller than the first TBS index; determines a time-frequency resource, and determines, according to the time-frequency resource, a quantity of physical resource block pairs; selects, in a transport block size table, a transport block size TBS corresponding to the quantity of physical resource blocks and corresponding to the determined first TBS index or second TBS index; sends service data to a user equipment by adopting the selected TBS; and sends a system scheduling control signal to the user equipment, where the system scheduling control signal includes the modulation and coding level and the time-frequency resource. In this way, the base station can select a larger TBS corresponding to the modulation and coding level so as to achieve a higher coding rate and increase a system throughput.

Further, that the base station determines, in a first modulation and transport block size index table, a first transport block size TBS index and a first modulation mode that are corresponding to the modulation and coding level, or determines, in a second modulation and transport block size index table, a second TBS index and a second modulation mode that are corresponding to the modulation and coding level includes that: the base station may, according to a system configuration parameter or a system overhead size, determine, in the first modulation and transport block size index table, the first transport block size TBS index and the first modulation mode that are corresponding to the modulation and coding level, or determines, in the second modulation and transport block size index table, the second TBS index and the second modulation mode that are corresponding to the modulation and coding level.

For example, when the system configuration parameter indicates that a control signaling includes a physical downlink control channel, the base station chooses to determine, in the first modulation and transport block size index table, the first transport block size TBS index and the first modulation mode that are corresponding to the modulation and coding level; and when the system configuration parameter indicates that the control signaling does not include a physical downlink control channel, the base station chooses to determine, in the second modulation and transport block size index table, the second TBS index and the second modulation mode that are corresponding to the modulation and coding level.

Or, when the system overhead size is 48 resource elements, the base station chooses to determine, in the first modulation and transport block size index table, the first transport block size TBS index and the first modulation mode that are corresponding to the modulation and coding level; and when the system overhead size is 12 resource elements, the base station chooses to determine, in the second modulation and transport block size index table, the second TBS index and the second modulation mode that are corresponding to the modulation and coding level.

Further, the base station may also send a high-layer signaling message to the user equipment, where the high-layer signaling message carries indication information of a selection to determine, in the first modulation and transport block size index table, the first transport block size TBS index and the first modulation mode that are corresponding to the modulation and coding level, or determine, in the second modulation and transport block size index table, the second TBS index and the second modulation mode that are corresponding to the modulation and coding level.

Further, the base station sends a downlink control message to the user equipment, where the downlink control message carries indication information of a selection to determine, in the first modulation and transport block size index table, the first transport block size TBS index and the first modulation mode that are corresponding to the modulation and coding level, or determine, in the second modulation and transport block size index table, the second TBS index and the second modulation mode that are corresponding to the modulation and coding level. By carrying, by the base station in the downlink control message, the indication information indicating whether the first modulation and transport block size index table or the second modulation and transport block size index table is selected, a speed of the base station in switching between the first modulation and transport block size index table and the second modulation and transport block size index table can be increased.

Further, the transport block size table includes a layer 1 data transport block size table in Long Term Evolution Release 8 LTE REL.8. Specifically, the layer 1 data transport block size table in LTE REL.8 may be shown in Table 1.

TABLE 1

1. Layer 1 data transport block size table in LTE REL.8

| $I_{TBS}$ | \multicolumn{10}{c}{$N_{PRB}$} |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

| $I_{TBS}$ | \multicolumn{10}{c}{$N_{PRB}$} |
|---|---|---|---|---|---|---|---|---|---|---|
| | 11 | 12 | 13 | 14 | 15 | 16 | 17 | 18 | 19 | 20 |
| 0 | 288 | 328 | 344 | 376 | 392 | 424 | 456 | 488 | 504 | 536 |
| 1 | 376 | 424 | 456 | 488 | 520 | 568 | 600 | 632 | 680 | 712 |
| 2 | 472 | 520 | 568 | 616 | 648 | 696 | 744 | 776 | 840 | 872 |
| 3 | 616 | 680 | 744 | 808 | 872 | 904 | 968 | 1032 | 1096 | 1160 |
| 4 | 776 | 840 | 904 | 1000 | 1064 | 1128 | 1192 | 1288 | 1352 | 1416 |
| 5 | 968 | 1032 | 1128 | 1224 | 1320 | 1384 | 1480 | 1544 | 1672 | 1736 |
| 6 | 1128 | 1224 | 1352 | 1480 | 1544 | 1672 | 1736 | 1864 | 1992 | 2088 |
| 7 | 1320 | 1480 | 1608 | 1672 | 1800 | 1928 | 2088 | 2216 | 2344 | 2472 |
| 8 | 1544 | 1672 | 1800 | 1928 | 2088 | 2216 | 2344 | 2536 | 2664 | 2792 |
| 9 | 1736 | 1864 | 2024 | 2216 | 2344 | 2536 | 2664 | 2856 | 2984 | 3112 |
| 10 | 1928 | 2088 | 2280 | 2472 | 2664 | 2792 | 2984 | 3112 | 3368 | 3496 |
| 11 | 2216 | 2408 | 2600 | 2792 | 2984 | 3240 | 3496 | 3624 | 3880 | 4008 |
| 12 | 2472 | 2728 | 2984 | 3240 | 3368 | 3624 | 3880 | 4136 | 4392 | 4584 |
| 13 | 2856 | 3112 | 3368 | 3624 | 3880 | 4136 | 4392 | 4584 | 4968 | 5160 |
| 14 | 3112 | 3496 | 3752 | 4008 | 4264 | 4584 | 4968 | 5160 | 5544 | 5736 |
| 15 | 3368 | 3624 | 4008 | 4264 | 4584 | 4968 | 5160 | 5544 | 5736 | 6200 |
| 16 | 3624 | 3880 | 4264 | 4584 | 4968 | 5160 | 5544 | 5992 | 6200 | 6456 |
| 17 | 4008 | 4392 | 4776 | 5160 | 5352 | 5736 | 6200 | 6456 | 6712 | 7224 |
| 18 | 4392 | 4776 | 5160 | 5544 | 5992 | 6200 | 6712 | 7224 | 7480 | 7992 |
| 19 | 4776 | 5160 | 5544 | 5992 | 6456 | 6968 | 7224 | 7736 | 8248 | 8504 |
| 20 | 5160 | 5544 | 5992 | 6456 | 6968 | 7480 | 7992 | 8248 | 8760 | 9144 |
| 21 | 5544 | 5992 | 6456 | 6968 | 7480 | 7992 | 8504 | 9144 | 9528 | 9912 |
| 22 | 5992 | 6456 | 6968 | 7480 | 7992 | 8504 | 9144 | 9528 | 10296 | 10680 |
| 23 | 6200 | 6968 | 7480 | 7992 | 8504 | 9144 | 9912 | 10296 | 11064 | 11448 |
| 24 | 6712 | 7224 | 7992 | 8504 | 9144 | 9912 | 10296 | 11064 | 11448 | 12216 |
| 25 | 6968 | 7480 | 8248 | 8760 | 9528 | 10296 | 10680 | 11448 | 12216 | 12576 |
| 26 | 8248 | 8760 | 9528 | 10296 | 11064 | 11832 | 12576 | 13536 | 14112 | 14688 |

TABLE 1-continued

1. Layer 1 data transport block size table in LTE REL.8

| $I_{TBS}$ | \multicolumn{10}{c}{$N_{PRB}$} |
|---|---|---|---|---|---|---|---|---|---|---|
| | 21 | 22 | 23 | 24 | 25 | 26 | 27 | 28 | 29 | 30 |
| 0 | 568 | 600 | 616 | 648 | 680 | 712 | 744 | 776 | 776 | 808 |
| 1 | 744 | 776 | 808 | 872 | 904 | 936 | 968 | 1000 | 1032 | 1064 |
| 2 | 936 | 968 | 1000 | 1064 | 1096 | 1160 | 1192 | 1256 | 1288 | 1320 |
| 3 | 1224 | 1256 | 1320 | 1384 | 1416 | 1480 | 1544 | 1608 | 1672 | 1736 |
| 4 | 1480 | 1544 | 1608 | 1736 | 1800 | 1864 | 1928 | 1992 | 2088 | 2152 |
| 5 | 1864 | 1928 | 2024 | 2088 | 2216 | 2280 | 2344 | 2472 | 2536 | 2664 |
| 6 | 2216 | 2280 | 2408 | 2472 | 2600 | 2728 | 2792 | 2984 | 2984 | 3112 |
| 7 | 2536 | 2664 | 2792 | 2984 | 3112 | 3240 | 3368 | 3368 | 3496 | 3624 |
| 8 | 2984 | 3112 | 3240 | 3368 | 3496 | 3624 | 3752 | 3880 | 4008 | 4264 |
| 9 | 3368 | 3496 | 3624 | 3752 | 4008 | 4136 | 4264 | 4392 | 4584 | 4776 |
| 10 | 3752 | 3880 | 4008 | 4264 | 4392 | 4584 | 4776 | 4968 | 5160 | 5352 |
| 11 | 4264 | 4392 | 4584 | 4776 | 4968 | 5352 | 5544 | 5736 | 5992 | 5992 |
| 12 | 4776 | 4968 | 5352 | 5544 | 5736 | 5992 | 6200 | 6456 | 6712 | 6712 |
| 13 | 5352 | 5736 | 5992 | 6200 | 6456 | 6712 | 6968 | 7224 | 7480 | 7736 |
| 14 | 5992 | 6200 | 6456 | 6968 | 7224 | 7480 | 7736 | 7992 | 8248 | 8504 |
| 15 | 6456 | 6712 | 6968 | 7224 | 7736 | 7992 | 8248 | 8504 | 8760 | 9144 |
| 16 | 6712 | 7224 | 7480 | 7736 | 7992 | 8504 | 8760 | 9144 | 9528 | 9912 |
| 17 | 7480 | 7992 | 8248 | 8760 | 9144 | 9528 | 9912 | 10296 | 10296 | 10680 |
| 18 | 8248 | 8760 | 9144 | 9528 | 9912 | 10296 | 10680 | 11064 | 11448 | 11832 |
| 19 | 9144 | 9528 | 9912 | 10296 | 10680 | 11064 | 11448 | 12216 | 12576 | 12960 |
| 20 | 9912 | 10296 | 10680 | 11064 | 11448 | 12216 | 12576 | 12960 | 13536 | 14112 |
| 21 | 10680 | 11064 | 11448 | 12216 | 12576 | 12960 | 13536 | 14112 | 14688 | 15264 |
| 22 | 11448 | 11832 | 12576 | 12960 | 13536 | 14112 | 14688 | 15264 | 15840 | 16416 |
| 23 | 12216 | 12576 | 12960 | 13536 | 14112 | 14688 | 15264 | 15840 | 16416 | 16992 |
| 24 | 12960 | 13536 | 14112 | 14688 | 15264 | 15840 | 16416 | 16992 | 17568 | 18336 |
| 25 | 13536 | 14112 | 14688 | 15264 | 15840 | 16416 | 16992 | 17568 | 18336 | 19080 |
| 26 | 15264 | 16416 | 16992 | 17568 | 18336 | 19080 | 19848 | 20616 | 21384 | 22152 |

| $I_{TBS}$ | \multicolumn{10}{c}{$N_{PRB}$} |
|---|---|---|---|---|---|---|---|---|---|---|
| | 31 | 32 | 33 | 34 | 35 | 36 | 37 | 38 | 39 | 40 |
| 0 | 840 | 872 | 904 | 936 | 968 | 1000 | 1032 | 1032 | 1064 | 1096 |
| 1 | 1128 | 1160 | 1192 | 1224 | 1256 | 1288 | 1352 | 1384 | 1416 | 1416 |
| 2 | 1384 | 1416 | 1480 | 1544 | 1544 | 1608 | 1672 | 1672 | 1736 | 1800 |
| 3 | 1800 | 1864 | 1928 | 1992 | 2024 | 2088 | 2152 | 2216 | 2280 | 2344 |
| 4 | 2216 | 2280 | 2344 | 2408 | 2472 | 2600 | 2664 | 2728 | 2792 | 2856 |
| 5 | 2728 | 2792 | 2856 | 2984 | 3112 | 3112 | 3240 | 3368 | 3496 | 3496 |
| 6 | 3240 | 3368 | 3496 | 3496 | 3624 | 3752 | 3880 | 4008 | 4136 | 4136 |
| 7 | 3752 | 3880 | 4008 | 4136 | 4264 | 4392 | 4584 | 4584 | 4776 | 4968 |
| 8 | 4392 | 4584 | 4584 | 4776 | 4968 | 4968 | 5160 | 5352 | 5544 | 5544 |
| 9 | 4968 | 5160 | 5160 | 5352 | 5544 | 5736 | 5736 | 5992 | 6200 | 6200 |
| 10 | 5544 | 5736 | 5736 | 5992 | 6200 | 6200 | 6456 | 6712 | 6712 | 6968 |
| 11 | 6200 | 6456 | 6712 | 6968 | 6968 | 7224 | 7480 | 7736 | 7736 | 7992 |
| 12 | 6968 | 7224 | 7480 | 7736 | 7992 | 8248 | 8504 | 8760 | 8760 | 9144 |
| 13 | 7992 | 8248 | 8504 | 8760 | 9144 | 9144 | 9528 | 9912 | 9912 | 10296 |
| 14 | 8760 | 9144 | 9528 | 9912 | 9912 | 10296 | 10680 | 11064 | 11064 | 11448 |
| 15 | 9528 | 9912 | 10296 | 10296 | 10680 | 11064 | 11448 | 11832 | 11832 | 12216 |
| 16 | 9912 | 10296 | 10680 | 11064 | 11448 | 11832 | 12216 | 12216 | 12576 | 12960 |
| 17 | 11064 | 11448 | 11832 | 12216 | 12576 | 12960 | 13536 | 13536 | 14112 | 14688 |
| 18 | 12216 | 12576 | 12960 | 13536 | 14112 | 14112 | 14688 | 15264 | 15264 | 15840 |
| 19 | 13536 | 13536 | 14112 | 14688 | 15264 | 15264 | 15840 | 16416 | 16992 | 16992 |
| 20 | 14688 | 14688 | 15264 | 15840 | 16416 | 16992 | 16992 | 17568 | 18336 | 18336 |
| 21 | 15840 | 15840 | 16416 | 16992 | 17568 | 18336 | 18336 | 19080 | 19848 | 19848 |
| 22 | 16992 | 16992 | 17568 | 18336 | 19080 | 19080 | 19848 | 20616 | 21384 | 21384 |
| 23 | 17568 | 18336 | 19080 | 19848 | 19848 | 20616 | 21384 | 22152 | 22152 | 22920 |
| 24 | 19080 | 19848 | 19848 | 20616 | 21384 | 22152 | 22920 | 23688 | 23688 | 24496 |
| 25 | 19848 | 20616 | 20616 | 21384 | 22152 | 22920 | 23688 | 24496 | 24496 | 25456 |
| 26 | 22920 | 23688 | 24496 | 25456 | 25456 | 26416 | 27376 | 28336 | 29296 | 29296 |

| $I_{TBS}$ | \multicolumn{10}{c}{$N_{PRB}$} |
|---|---|---|---|---|---|---|---|---|---|---|
| | 41 | 42 | 43 | 44 | 45 | 46 | 47 | 48 | 49 | 50 |
| 0 | 1128 | 1160 | 1192 | 1224 | 1256 | 1256 | 1288 | 1320 | 1352 | 1384 |
| 1 | 1480 | 1544 | 1544 | 1608 | 1608 | 1672 | 1736 | 1736 | 1800 | 1800 |
| 2 | 1800 | 1864 | 1928 | 1992 | 2024 | 2088 | 2088 | 2152 | 2216 | 2216 |
| 3 | 2408 | 2472 | 2536 | 2536 | 2600 | 2664 | 2728 | 2792 | 2856 | 2856 |
| 4 | 2984 | 2984 | 3112 | 3112 | 3240 | 3240 | 3368 | 3496 | 3496 | 3624 |
| 5 | 3624 | 3752 | 3752 | 3880 | 4008 | 4008 | 4136 | 4264 | 4392 | 4392 |
| 6 | 4264 | 4392 | 4584 | 4584 | 4776 | 4776 | 4968 | 4968 | 5160 | 5160 |
| 7 | 4968 | 5160 | 5352 | 5352 | 5544 | 5736 | 5736 | 5992 | 5992 | 6200 |
| 8 | 5736 | 5992 | 5992 | 6200 | 6200 | 6456 | 6456 | 6712 | 6968 | 6968 |
| 9 | 6456 | 6712 | 6712 | 6968 | 6968 | 7224 | 7480 | 7480 | 7736 | 7992 |

TABLE 1-continued

1. Layer 1 data transport block size table in LTE REL.8

| | | | | | | | | | |
|---|---|---|---|---|---|---|---|---|---|
| 10 | 7224 | 7480 | 7480 | 7736 | 7992 | 7992 | 8248 | 8504 | 8504 | 8760 |
| 11 | 8248 | 8504 | 8760 | 8760 | 9144 | 9144 | 9528 | 9528 | 9912 | 9912 |
| 12 | 9528 | 9528 | 9912 | 9912 | 10296 | 10680 | 10680 | 11064 | 11064 | 11448 |
| 13 | 10680 | 10680 | 11064 | 11448 | 11448 | 11832 | 12216 | 12216 | 12576 | 12960 |
| 14 | 11832 | 12216 | 12216 | 12576 | 12960 | 12960 | 13536 | 13536 | 14112 | 14112 |
| 15 | 12576 | 12960 | 12960 | 13536 | 13536 | 14112 | 14688 | 14688 | 15264 | 15264 |
| 16 | 13536 | 13536 | 14112 | 14112 | 14688 | 14688 | 15264 | 15840 | 15840 | 16416 |
| 17 | 14688 | 15264 | 15264 | 15840 | 16416 | 16416 | 16992 | 17568 | 17568 | 18336 |
| 18 | 16416 | 16416 | 16992 | 17568 | 17568 | 18336 | 18336 | 19080 | 19080 | 19848 |
| 19 | 17568 | 18336 | 18336 | 19080 | 19080 | 19848 | 20616 | 20616 | 21384 | 21384 |
| 20 | 19080 | 19848 | 19848 | 20616 | 20616 | 21384 | 22152 | 22152 | 22920 | 22920 |
| 21 | 20616 | 21384 | 21384 | 22152 | 22920 | 22920 | 23688 | 24496 | 24496 | 25456 |
| 22 | 22152 | 22920 | 22920 | 23688 | 24496 | 24496 | 25456 | 25456 | 26416 | 27376 |
| 23 | 23688 | 24496 | 24496 | 25456 | 25456 | 26416 | 27376 | 27376 | 28336 | 28336 |
| 24 | 25456 | 25456 | 26416 | 26416 | 27376 | 28336 | 28336 | 29296 | 29296 | 30576 |
| 25 | 26416 | 26416 | 27376 | 28336 | 28336 | 29296 | 29296 | 30576 | 31704 | 31704 |
| 26 | 30576 | 30576 | 31704 | 32856 | 32856 | 34008 | 35160 | 35160 | 36696 | 36696 |

| | $N_{PRB}$ | | | | | | | | | |
|---|---|---|---|---|---|---|---|---|---|
| $I_{TBS}$ | 51 | 52 | 53 | 54 | 55 | 56 | 57 | 58 | 59 | 60 |
| 0 | 1416 | 1416 | 1480 | 1480 | 1544 | 1544 | 1608 | 1608 | 1608 | 1672 |
| 1 | 1864 | 1864 | 1928 | 1992 | 1992 | 2024 | 2088 | 2088 | 2152 | 2152 |
| 2 | 2280 | 2344 | 2344 | 2408 | 2472 | 2536 | 2536 | 2600 | 2664 | 2664 |
| 3 | 2984 | 2984 | 3112 | 3112 | 3240 | 3240 | 3368 | 3368 | 3496 | 3496 |
| 4 | 3624 | 3752 | 3752 | 3880 | 4008 | 4008 | 4136 | 4136 | 4264 | 4264 |
| 5 | 4584 | 4584 | 4776 | 4776 | 4776 | 4968 | 4968 | 5160 | 5160 | 5352 |
| 6 | 5352 | 5352 | 5544 | 5736 | 5736 | 5992 | 5992 | 5992 | 6200 | 6200 |
| 7 | 6200 | 6456 | 6456 | 6712 | 6712 | 6712 | 6968 | 6968 | 7224 | 7224 |
| 8 | 7224 | 7224 | 7480 | 7480 | 7736 | 7736 | 7992 | 7992 | 8248 | 8504 |
| 9 | 7992 | 8248 | 8248 | 8504 | 8760 | 8760 | 9144 | 9144 | 9144 | 9528 |
| 10 | 9144 | 9144 | 9144 | 9528 | 9528 | 9912 | 9912 | 10296 | 10296 | 10680 |
| 11 | 10296 | 10680 | 10680 | 11064 | 11064 | 11448 | 11448 | 11832 | 11832 | 12216 |
| 12 | 11832 | 11832 | 12216 | 12216 | 12576 | 12576 | 12960 | 12960 | 13536 | 13536 |
| 13 | 12960 | 13536 | 13536 | 14112 | 14112 | 14688 | 14688 | 14688 | 15264 | 15264 |
| 14 | 14688 | 14688 | 15264 | 15264 | 15840 | 15840 | 16416 | 16416 | 16992 | 16992 |
| 15 | 15840 | 15840 | 16416 | 16416 | 16992 | 16992 | 17568 | 17568 | 18336 | 18336 |
| 16 | 16416 | 16992 | 16992 | 17568 | 17568 | 18336 | 18336 | 19080 | 19080 | 19848 |
| 17 | 18336 | 19080 | 19080 | 19848 | 19848 | 20616 | 20616 | 21384 | 21384 | 21384 |
| 18 | 19848 | 20616 | 21384 | 21384 | 22152 | 22152 | 22920 | 22920 | 23688 | 23688 |
| 19 | 22152 | 22152 | 22920 | 22920 | 23688 | 24496 | 24496 | 25456 | 25456 | 25456 |
| 20 | 23688 | 24496 | 24496 | 25456 | 25456 | 26416 | 26416 | 27376 | 27376 | 28336 |
| 21 | 25456 | 26416 | 26416 | 27376 | 27376 | 28336 | 28336 | 29296 | 29296 | 30576 |
| 22 | 27376 | 28336 | 28336 | 29296 | 29296 | 30576 | 30576 | 31704 | 31704 | 32856 |
| 23 | 29296 | 29296 | 30576 | 30576 | 31704 | 31704 | 32856 | 32856 | 34008 | 34008 |
| 24 | 31704 | 31704 | 32856 | 32856 | 34008 | 34008 | 35160 | 35160 | 36696 | 36696 |
| 25 | 32856 | 32856 | 34008 | 34008 | 35160 | 35160 | 36696 | 36696 | 37888 | 37888 |
| 26 | 37888 | 37888 | 39232 | 40576 | 40576 | 40576 | 42368 | 42368 | 43816 | 43816 |

| | $N_{PRB}$ | | | | | | | | | |
|---|---|---|---|---|---|---|---|---|---|
| $I_{TBS}$ | 61 | 62 | 63 | 64 | 65 | 66 | 67 | 68 | 69 | 70 |
| 0 | 1672 | 1736 | 1736 | 1800 | 1800 | 1800 | 1864 | 1864 | 1928 | 1928 |
| 1 | 2216 | 2280 | 2280 | 2344 | 2344 | 2408 | 2472 | 2472 | 2536 | 2536 |
| 2 | 2728 | 2792 | 2856 | 2856 | 2856 | 2984 | 2984 | 3112 | 3112 | 3112 |
| 3 | 3624 | 3624 | 3624 | 3752 | 3752 | 3880 | 3880 | 4008 | 4008 | 4136 |
| 4 | 4392 | 4392 | 4584 | 4584 | 4584 | 4776 | 4776 | 4968 | 4968 | 4968 |
| 5 | 5352 | 5544 | 5544 | 5736 | 5736 | 5736 | 5992 | 5992 | 5992 | 6200 |
| 6 | 6456 | 6456 | 6456 | 6712 | 6712 | 6968 | 6968 | 6968 | 7224 | 7224 |
| 7 | 7480 | 7480 | 7736 | 7736 | 7992 | 7992 | 8248 | 8248 | 8504 | 8504 |
| 8 | 8504 | 8760 | 8760 | 9144 | 9144 | 9144 | 9528 | 9528 | 9528 | 9912 |
| 9 | 9528 | 9912 | 9912 | 10296 | 10296 | 10296 | 10680 | 10680 | 11064 | 11064 |
| 10 | 10680 | 11064 | 11064 | 11448 | 11448 | 11448 | 11832 | 11832 | 12216 | 12216 |
| 11 | 12216 | 12576 | 12576 | 12960 | 12960 | 13536 | 13536 | 13536 | 14112 | 14112 |
| 12 | 14112 | 14112 | 14112 | 14688 | 14688 | 15264 | 15264 | 15264 | 15840 | 15840 |
| 13 | 15840 | 15840 | 16416 | 16416 | 16992 | 16992 | 16992 | 17568 | 17568 | 18336 |
| 14 | 17568 | 17568 | 18336 | 18336 | 18336 | 19080 | 19080 | 19848 | 19848 | 19848 |
| 15 | 18336 | 19080 | 19080 | 19848 | 19848 | 20616 | 20616 | 20616 | 21384 | 21384 |
| 16 | 19848 | 19848 | 20616 | 20616 | 21384 | 21384 | 22152 | 22152 | 22152 | 22920 |
| 17 | 22152 | 22152 | 22920 | 22920 | 23688 | 23688 | 24496 | 24496 | 24496 | 25456 |
| 18 | 24496 | 24496 | 24496 | 25456 | 25456 | 26416 | 26416 | 27376 | 27376 | 27376 |
| 19 | 26416 | 26416 | 27376 | 27376 | 28336 | 28336 | 29296 | 29296 | 29296 | 30576 |
| 20 | 28336 | 29296 | 29296 | 29296 | 30576 | 30576 | 31704 | 31704 | 31704 | 32856 |
| 21 | 30576 | 31704 | 31704 | 31704 | 32856 | 32856 | 34008 | 34008 | 35160 | 35160 |
| 22 | 32856 | 34008 | 34008 | 34008 | 35160 | 35160 | 36696 | 36696 | 36696 | 37888 |
| 23 | 35160 | 35160 | 36696 | 36696 | 37888 | 37888 | 37888 | 39232 | 39232 | 40576 |

TABLE 1-continued

1. Layer 1 data transport block size table in LTE REL.8

| | | | | | | | | | |
|---|---|---|---|---|---|---|---|---|---|
| 24 | 36696 | 37888 | 37888 | 39232 | 39232 | 40576 | 40576 | 42368 | 42368 | 42368 |
| 25 | 39232 | 39232 | 40576 | 40576 | 40576 | 42368 | 42368 | 43816 | 43816 | 43816 |
| 26 | 45352 | 45352 | 46888 | 46888 | 48936 | 48936 | 48936 | 51024 | 51024 | 52752 |

| | $N_{PRB}$ | | | | | | | | | |
|---|---|---|---|---|---|---|---|---|---|---|
| $I_{TBS}$ | 71 | 72 | 73 | 74 | 75 | 76 | 77 | 78 | 79 | 80 |
| 0 | 1992 | 1992 | 2024 | 2088 | 2088 | 2088 | 2152 | 2152 | 2216 | 2216 |
| 1 | 2600 | 2600 | 2664 | 2728 | 2728 | 2792 | 2792 | 2856 | 2856 | 2856 |
| 2 | 3240 | 3240 | 3240 | 3368 | 3368 | 3368 | 3496 | 3496 | 3496 | 3624 |
| 3 | 4136 | 4264 | 4264 | 4392 | 4392 | 4392 | 4584 | 4584 | 4584 | 4776 |
| 4 | 5160 | 5160 | 5160 | 5352 | 5352 | 5544 | 5544 | 5544 | 5736 | 5736 |
| 5 | 6200 | 6200 | 6456 | 6456 | 6712 | 6712 | 6712 | 6968 | 6968 | 6968 |
| 6 | 7480 | 7480 | 7736 | 7736 | 7736 | 7992 | 7992 | 8248 | 8248 | 8248 |
| 7 | 8760 | 8760 | 8760 | 9144 | 9144 | 9144 | 9528 | 9528 | 9528 | 9912 |
| 8 | 9912 | 9912 | 10296 | 10296 | 10680 | 10680 | 10680 | 11064 | 11064 | 11064 |
| 9 | 11064 | 11448 | 11448 | 11832 | 11832 | 11832 | 12216 | 12216 | 12576 | 12576 |
| 10 | 12576 | 12576 | 12960 | 12960 | 12960 | 13536 | 13536 | 13536 | 14112 | 14112 |
| 11 | 14112 | 14688 | 14688 | 14688 | 15264 | 15264 | 15840 | 15840 | 15840 | 16416 |
| 12 | 16416 | 16416 | 16416 | 16992 | 16992 | 17568 | 17568 | 17568 | 18336 | 18336 |
| 13 | 18336 | 18336 | 19080 | 19080 | 19080 | 19848 | 19848 | 19848 | 20616 | 20616 |
| 14 | 20616 | 20616 | 20616 | 21384 | 21384 | 22152 | 22152 | 22152 | 22920 | 22920 |
| 15 | 22152 | 22152 | 22152 | 22920 | 22920 | 23688 | 23688 | 23688 | 24496 | 24496 |
| 16 | 22920 | 23688 | 23688 | 24496 | 24496 | 24496 | 25456 | 25456 | 25456 | 26416 |
| 17 | 25456 | 26416 | 26416 | 26416 | 27376 | 27376 | 27376 | 28336 | 28336 | 29296 |
| 18 | 28336 | 28336 | 29296 | 29296 | 29296 | 30576 | 30576 | 30576 | 31704 | 31704 |
| 19 | 30576 | 30576 | 31704 | 31704 | 32856 | 32856 | 32856 | 34008 | 34008 | 34008 |
| 20 | 32856 | 34008 | 34008 | 34008 | 35160 | 35160 | 35160 | 36696 | 36696 | 36696 |
| 21 | 35160 | 36696 | 36696 | 36696 | 37888 | 37888 | 39232 | 39232 | 39232 | 40576 |
| 22 | 37888 | 39232 | 39232 | 40576 | 40576 | 40576 | 42368 | 42368 | 42368 | 43816 |
| 23 | 40576 | 40576 | 42368 | 42368 | 43816 | 43816 | 43816 | 45352 | 45352 | 45352 |
| 24 | 43816 | 43816 | 45352 | 45352 | 45352 | 46888 | 46888 | 46888 | 48936 | 48936 |
| 25 | 45352 | 45352 | 46888 | 46888 | 46888 | 48936 | 48936 | 48936 | 51024 | 51024 |
| 26 | 52752 | 52752 | 55056 | 55056 | 55056 | 55056 | 57336 | 57336 | 57336 | 59256 |

| | $N_{PRB}$ | | | | | | | | | |
|---|---|---|---|---|---|---|---|---|---|---|
| $I_{TBS}$ | 81 | 82 | 83 | 84 | 85 | 86 | 87 | 88 | 89 | 90 |
| 0 | 2280 | 2280 | 2280 | 2344 | 2344 | 2408 | 2408 | 2472 | 2472 | 2536 |
| 1 | 2984 | 2984 | 2984 | 3112 | 3112 | 3112 | 3240 | 3240 | 3240 | 3240 |
| 2 | 3624 | 3624 | 3752 | 3752 | 3880 | 3880 | 3880 | 4008 | 4008 | 4008 |
| 3 | 4776 | 4776 | 4776 | 4968 | 4968 | 4968 | 5160 | 5160 | 5160 | 5352 |
| 4 | 5736 | 5992 | 5992 | 5992 | 5992 | 6200 | 6200 | 6200 | 6456 | 6456 |
| 5 | 7224 | 7224 | 7224 | 7480 | 7480 | 7480 | 7736 | 7736 | 7736 | 7992 |
| 6 | 8504 | 8504 | 8760 | 8760 | 8760 | 9144 | 9144 | 9144 | 9144 | 9528 |
| 7 | 9912 | 9912 | 10296 | 10296 | 10296 | 10680 | 10680 | 10680 | 11064 | 11064 |
| 8 | 11448 | 11448 | 11448 | 11832 | 11832 | 12216 | 12216 | 12216 | 12576 | 12576 |
| 9 | 12960 | 12960 | 12960 | 13536 | 13536 | 13536 | 13536 | 14112 | 14112 | 14112 |
| 10 | 14112 | 14688 | 14688 | 14688 | 14688 | 15264 | 15264 | 15264 | 15840 | 15840 |
| 11 | 16416 | 16416 | 16992 | 16992 | 16992 | 17568 | 17568 | 18336 | 18336 | 18336 |
| 12 | 18336 | 19080 | 19080 | 19080 | 19080 | 19848 | 19848 | 19848 | 20616 | 20616 |
| 13 | 20616 | 21384 | 21384 | 21384 | 22152 | 22152 | 22152 | 22920 | 22920 | 22920 |
| 14 | 22920 | 23688 | 23688 | 24496 | 24496 | 24496 | 25456 | 25456 | 25456 | 25456 |
| 15 | 24496 | 25456 | 25456 | 25456 | 26416 | 26416 | 26416 | 27376 | 27376 | 27376 |
| 16 | 26416 | 26416 | 27376 | 27376 | 27376 | 28336 | 28336 | 28336 | 29296 | 29296 |
| 17 | 29296 | 29296 | 30576 | 30576 | 30576 | 30576 | 31704 | 31704 | 31704 | 32856 |
| 18 | 31704 | 32856 | 32856 | 32856 | 34008 | 34008 | 34008 | 35160 | 35160 | 35160 |
| 19 | 35160 | 35160 | 35160 | 36696 | 36696 | 36696 | 37888 | 37888 | 37888 | 39232 |
| 20 | 37888 | 37888 | 39232 | 39232 | 39232 | 40576 | 40576 | 40576 | 42368 | 42368 |
| 21 | 40576 | 40576 | 42368 | 42368 | 42368 | 43816 | 43816 | 43816 | 45352 | 45352 |
| 22 | 43816 | 43816 | 45352 | 45352 | 45352 | 46888 | 46888 | 46888 | 48936 | 48936 |
| 23 | 46888 | 46888 | 46888 | 48936 | 48936 | 48936 | 51024 | 51024 | 51024 | 51024 |
| 24 | 48936 | 51024 | 51024 | 51024 | 52752 | 52752 | 52752 | 55056 | 55056 | 55056 |
| 25 | 51024 | 52752 | 52752 | 52752 | 55056 | 55056 | 55056 | 55056 | 57336 | 57336 |
| 26 | 59256 | 59256 | 61664 | 61664 | 61664 | 63776 | 63776 | 63776 | 66592 | 66592 |

| | $N_{PRB}$ | | | | | | | | | |
|---|---|---|---|---|---|---|---|---|---|---|
| $I_{TBS}$ | 91 | 92 | 93 | 94 | 95 | 96 | 97 | 98 | 99 | 100 |
| 0 | 2536 | 2536 | 2600 | 2600 | 2664 | 2664 | 2728 | 2728 | 2728 | 2792 |
| 1 | 3368 | 3368 | 3368 | 3496 | 3496 | 3496 | 3496 | 3624 | 3624 | 3624 |
| 2 | 4136 | 4136 | 4136 | 4264 | 4264 | 4264 | 4392 | 4392 | 4392 | 4584 |
| 3 | 5352 | 5352 | 5352 | 5544 | 5544 | 5544 | 5736 | 5736 | 5736 | 5736 |
| 4 | 6456 | 6456 | 6712 | 6712 | 6712 | 6968 | 6968 | 6968 | 6968 | 7224 |
| 5 | 7992 | 7992 | 8248 | 8248 | 8248 | 8504 | 8504 | 8760 | 8760 | 8760 |

TABLE 1-continued

1. Layer 1 data transport block size table in LTE REL.8

| $I_{TBS}$ | | | | | | | | | | |
|---|---|---|---|---|---|---|---|---|---|---|
| 6 | 9528 | 9528 | 9528 | 9912 | 9912 | 9912 | 10296 | 10296 | 10296 | 10296 |
| 7 | 11064 | 11448 | 11448 | 11448 | 11448 | 11832 | 11832 | 11832 | 12216 | 12216 |
| 8 | 12576 | 12960 | 12960 | 12960 | 13536 | 13536 | 13536 | 13536 | 14112 | 14112 |
| 9 | 14112 | 14688 | 14688 | 14688 | 15264 | 15264 | 15264 | 15264 | 15840 | 15840 |
| 10 | 15840 | 16416 | 16416 | 16416 | 16992 | 16992 | 16992 | 16992 | 17568 | 17568 |
| 11 | 18336 | 18336 | 19080 | 19080 | 19080 | 19080 | 19848 | 19848 | 19848 | 19848 |
| 12 | 20616 | 21384 | 21384 | 21384 | 21384 | 22152 | 22152 | 22152 | 22920 | 22920 |
| 13 | 23688 | 23688 | 23688 | 24496 | 24496 | 24496 | 25456 | 25456 | 25456 | 25456 |
| 14 | 26416 | 26416 | 26416 | 27376 | 27376 | 27376 | 28336 | 28336 | 28336 | 28336 |
| 15 | 28336 | 28336 | 28336 | 29296 | 29296 | 29296 | 29296 | 30576 | 30576 | 30576 |
| 16 | 29296 | 30576 | 30576 | 30576 | 30576 | 31704 | 31704 | 31704 | 31704 | 32856 |
| 17 | 32856 | 32856 | 34008 | 34008 | 34008 | 35160 | 35160 | 35160 | 35160 | 36696 |
| 18 | 36696 | 36696 | 36696 | 37888 | 37888 | 37888 | 37888 | 39232 | 39232 | 39232 |
| 19 | 39232 | 39232 | 40576 | 40576 | 40576 | 40576 | 42368 | 42368 | 42368 | 43816 |
| 20 | 42368 | 42368 | 43816 | 43816 | 43816 | 45352 | 45352 | 45352 | 46888 | 46888 |
| 21 | 45352 | 46888 | 46888 | 46888 | 46888 | 48936 | 48936 | 48936 | 48936 | 51024 |
| 22 | 48936 | 48936 | 51024 | 51024 | 51024 | 51024 | 52752 | 52752 | 52752 | 55056 |
| 23 | 52752 | 52752 | 52752 | 55056 | 55056 | 55056 | 55056 | 57336 | 57336 | 57336 |
| 24 | 55056 | 55336 | 57336 | 57336 | 57336 | 59256 | 59256 | 59256 | 61664 | 61664 |
| 25 | 57336 | 59256 | 59256 | 59256 | 61664 | 61664 | 61664 | 61664 | 63776 | 63776 |
| 26 | 66592 | 68808 | 68808 | 68808 | 71112 | 71112 | 71112 | 73712 | 73712 | 75376 |

| | $N_{PRB}$ | | | | | | | | | |
|---|---|---|---|---|---|---|---|---|---|---|
| $I_{TBS}$ | 101 | 102 | 103 | 104 | 105 | 106 | 107 | 108 | 109 | 110 |
| 0 | 2792 | 2856 | 2856 | 2856 | 2984 | 2984 | 2984 | 2984 | 2984 | 3112 |
| 1 | 3752 | 3752 | 3752 | 3752 | 3880 | 3880 | 3880 | 4008 | 4008 | 4008 |
| 2 | 4584 | 4584 | 4584 | 4584 | 4776 | 4776 | 4776 | 4776 | 4968 | 4968 |
| 3 | 5992 | 5992 | 5992 | 5992 | 6200 | 6200 | 6200 | 6200 | 6456 | 6456 |
| 4 | 7224 | 7224 | 7480 | 7480 | 7480 | 7480 | 7736 | 7736 | 7736 | 7992 |
| 5 | 8760 | 9144 | 9144 | 9144 | 9144 | 9528 | 9528 | 9528 | 9528 | 9528 |
| 6 | 10680 | 10680 | 10680 | 10680 | 11064 | 11064 | 11064 | 11448 | 11448 | 11448 |
| 7 | 12216 | 12576 | 12576 | 12576 | 12960 | 12960 | 12960 | 12960 | 13536 | 13536 |
| 8 | 14112 | 14112 | 14688 | 14688 | 14688 | 14688 | 15264 | 15264 | 15264 | 15264 |
| 9 | 15840 | 16416 | 16416 | 16416 | 16416 | 16992 | 16992 | 16992 | 16992 | 17568 |
| 10 | 17568 | 18336 | 18336 | 18336 | 18336 | 18336 | 19080 | 19080 | 19080 | 19080 |
| 11 | 20616 | 20616 | 20616 | 21384 | 21384 | 21384 | 21384 | 22152 | 22152 | 22152 |
| 12 | 22920 | 23688 | 23688 | 23688 | 23688 | 24496 | 24496 | 24496 | 24496 | 25456 |
| 13 | 26416 | 26416 | 26416 | 26416 | 27376 | 27376 | 27376 | 28336 | 28336 | 28336 |
| 14 | 29296 | 29296 | 29296 | 29296 | 30576 | 30576 | 30576 | 30576 | 31704 | 31704 |
| 15 | 30576 | 31704 | 31704 | 31704 | 31704 | 32856 | 32856 | 32856 | 34008 | 34008 |
| 16 | 32856 | 32856 | 34008 | 34008 | 34008 | 34008 | 35160 | 35160 | 35160 | 35160 |
| 17 | 36696 | 36696 | 36696 | 37888 | 37888 | 37888 | 39232 | 39232 | 39232 | 39232 |
| 18 | 40576 | 40576 | 40576 | 40576 | 42368 | 42368 | 42368 | 42368 | 43816 | 43816 |
| 19 | 43816 | 43816 | 43816 | 45352 | 45352 | 45352 | 46888 | 46888 | 46888 | 46888 |
| 20 | 46888 | 46888 | 48936 | 48936 | 48936 | 48936 | 48936 | 51024 | 51024 | 51024 |
| 21 | 51024 | 51024 | 51024 | 52752 | 52752 | 52752 | 52752 | 55056 | 55056 | 55056 |
| 22 | 55056 | 55056 | 55056 | 57336 | 57336 | 57336 | 57336 | 59256 | 59256 | 59256 |
| 23 | 57336 | 59256 | 59256 | 59256 | 59256 | 61664 | 61664 | 61664 | 61664 | 63776 |
| 24 | 61664 | 61664 | 63776 | 63776 | 63776 | 63776 | 66592 | 66592 | 66592 | 66592 |
| 25 | 63776 | 63776 | 66592 | 66592 | 66592 | 66592 | 68808 | 68808 | 68808 | 71112 |
| 26 | 75376 | 75376 | 75376 | 75376 | 75376 | 75376 | 75376 | 75376 | 75376 | 75376 |

In Table 1, $N_{PRB}$ represents a quantity of physical resource block pairs, $I_{TBS}$ represents a value of a TBS index, and elements in the table represent transport block sizes TBS.

Further, the first modulation and transport block size index table is a modulation and transport block size index table in LTE REL.8. Specifically, the modulation and transport block size index table in LTE REL.8 may be shown in Table 2.

TABLE 2

2. Modulation and transport block size index table in LTE REL.8

| MCS Index $I_{MCS}$ | Modulation Order $Q_M$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |

TABLE 2-continued

2. Modulation and transport block size index table in LTE REL.8

| MCS Index $I_{MCS}$ | Modulation Order $Q_M$ | TBS Index $I_{TBS}$ |
|---|---|---|
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

Here, the MCS Index is a modulation and coding level index, where the MCS Index is corresponding to the MCS Level; the Modulation Order is a modulation order, where the Modulation Order is corresponding to a modulation mode; and the TBS Index is a transport block size index, that is, TBS index, where the MCS Index is in a one-to-one correspondence with the Modulation Order and the TBS Index. For example, for an MCS Level 10, a corresponding MCS Index is 10, a corresponding Modulation Order is 4, that is, modulation mode is 4, and a corresponding TBS Index is 9, that is, TBS index is 9.

Further, for the same modulation and coding level, if the second TBS index in the second modulation and transport block size index table is larger than the first TBS index in the first modulation and transport block size index table, a modulation order of the second modulation mode corresponding to the second TBS index is lower than a modulation order of the first modulation mode corresponding to the first TBS index.

Specifically, the second modulation and transport block size index table may be shown in Table 3.

TABLE 3

| MCS Index $I_{MCS}$ | Modulation Order $Q_M$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 2 | 10 |
| 11 | 2 | 11 |
| 12 | 4 | 11 |
| 13 | 4 | 12 |
| 14 | 4 | 13 |
| 15 | 4 | 14 |
| 16 | 4 | 15 |
| 17 | 4 | 16 |
| 18 | 4 | 17 |
| 19 | 4 | 18 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |

TABLE 3-continued

| MCS Index $I_{MCS}$ | Modulation Order $Q_M$ | TBS Index $I_{TBS}$ |
|---|---|---|
| 28 | 6 | 26 |
| 29 | 2 | reserved |
| 30 | 4 | |
| 31 | 6 | |

Here, the MCS Index is a modulation and coding level index corresponding to the MCS Level, the Modulation Order is a modulation order corresponding to a modulation mode, the TBS Index is a transport block size index, that is, TBS index, and the MCS Index is in a one-to-one correspondence to the Modulation Order and the TBS Index.

For example, TBS Indexes, that is, second TBS indexes, in Table 3 that are respectively corresponding to MCS Indexes 10 and 11 are 10 and 11, and the second TBS indexes are respectively larger than first TBS indexes 9 and 10 in Table 2 that are respectively corresponding to the MCS Indexes 10 and 11, and Modulation Orders, that is, second modulation modes, in Table 3 that are respectively corresponding to the MCS Indexes 10 and 11, are lower than Modulation Orders, that is, first modulation modes, in Table 2 that are respectively corresponding to the MCS Indexes 10 and 11, and may be one level lower, which means that the Modulation Order is reduced from 4 to 2.

For another example, TBS Indexes, that is, second TBS Indexes, in Table 3 that are respectively corresponding to MCS Indexes 17, 18 and 19 are 16, 17 and 18, and the second TBS indexes are respectively larger than first TBS indexes 15, 16 and 17 in Table 2 that are respectively corresponding to the MCS Indexes 17, 18 and 19, and then, Modulation Orders, that is, second modulation modes, in Table 3 that are respectively corresponding to the MCS Indexes 17, 18 and 19 are lower than Modulation Orders, that is, first modulation modes, in Table 2 that are respectively corresponding to the MCS Indexes 17, 18 and 19 and may be one level lower, which means that the Modulation Order is reduced from 6 to 4.

In other embodiments, a correspondence among MCS Indexes, Modulation Orders, and TBS Indexes in the second modulation and transport block size index table may also be interpreted as follows:

When the MCS Index is 0, corresponding Modulation Order and TBS Index are respectively 2 and 0; and when the MCS Index is sequentially incremented, where an increment coefficient may be 1, the TBS Index is also sequentially incremented, where the increment coefficient may also be 1, and the Modulation Order may be kept at 2.

When a corresponding coding rate is lower than but close to a first threshold, it is determined that a Modulation Order corresponding to a next level MCS Index is increased by one level in comparison with a Modulation Order corresponding to a previous level MCS Index, where a TBS Index corresponding to the next level MCS Index is equal to a TBS Index corresponding to the previous level MCS Index, and then, the MCS Index is sequentially incremented again, where the increment coefficient may be 1, the TBS Index is also sequentially increased, where the increment coefficient may also be 1, and the Modulation Order may be kept at 4.

When the corresponding coding rate is lower than but close to the first threshold, it is determined that a Modulation Order corresponding to a next level MCS Index is increased by one level in comparison with a Modulation Order corresponding to a previous level MCS Index, where a TBS Index corresponding to the next level MCS Index is equal to a TBS Index corresponding to the previous level MCS Index, and then, the MCS Index is sequentially incremented again, where the increment coefficient may be 1, the TBS Index is also sequentially incremented, where the increment coefficient may also be 1, and the Modulation Order may be kept at 6.

In this embodiment, the first threshold may be ⅔, and in other embodiments, the first threshold may also be other numerical values, which is not limited herein; and the coding rate may be a coding rate when a system overhead is assumed to be 12 REs.

Figure 2:
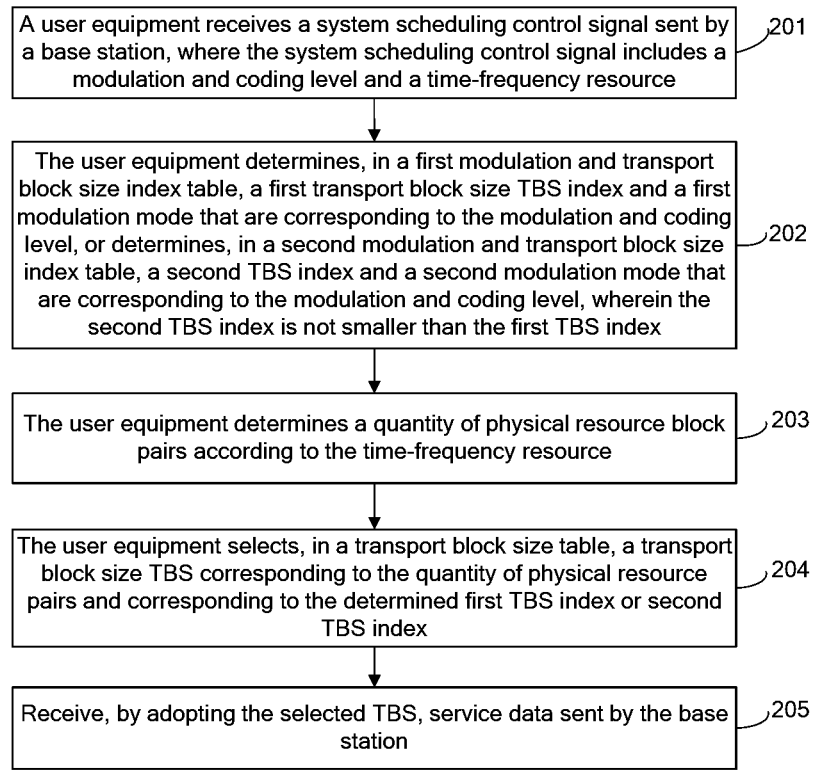
FIG. 2 is a method flowchart of a second embodiment of the data transmission method according to the present invention.

FIG. 2 is a method flowchart of a second embodiment of the data transmission method according to the present invention. As shown in FIG. 2, the data transmission method in this embodiment includes:

201. A user equipment receives a system scheduling control signal sent by a base station, where the system scheduling control signal includes a modulation and coding level and a time-frequency resource.

202. The user equipment determines, in a first modulation and transport block size index table, a first transport block size TBS index and a first modulation mode that are corresponding to the modulation and coding level, or determines, in a second modulation and transport block size index table, a second TBS index and a second modulation mode that are corresponding to the modulation and coding level, where the second TBS index is not smaller than the first TBS index.

For example, the modulation and coding level included in the system scheduling control signal received by the user equipment (User Equipment, UE for short) from the base station is 10; the UE determines, according to system configuration information or a high-layer signaling indication and in the first modulation and transport block size index table, a value of the first TBS index and a value of a modulation order that are corresponding to the modulation and coding level 10, where the value of the first TBS index corresponding to the modulation and coding level 10 is 9, and the value of the first modulation order is 4, where the value of the modulation order being 4 may indicate that the modulation mode is 16QAM;

For another example, the UE determines, according to system configuration information or a high-layer signaling indication and in the second modulation and transport block size index table, values of the second TBS index and a modulation order corresponding to the modulation and coding level 10, where the value of the second TBS index corresponding to the modulation and coding level 10 is 10 and the value of the second modulation order is 2, where the value of the second TBS index is not smaller than the value of the first TBS index determined in the first modulation and transport block size index table, so that the UE adopts the TBS determined by the value of the second TBS index which is not smaller than the value of the first TBS index to decode service data transmitted by the base station to the UE, which can increase a coding rate.

The value of the modulation order being 2 may indicate that the modulation mode is QPSK; and a value of a modulation order corresponding to another modulation and coding level in the first modulation and transport block size index table or the second modulation and transport block size index table may also be 6, where the value of the modulation order being 6 may indicate that the modulation mode is 64QAM.

203. The user equipment determines a quantity of physical resource block pairs according to the time-frequency resource.

For example, the UE determines, according the time-frequency resource included in the received system scheduling control signal, that physical resources occupied by the base station to transmit service data are 8 physical resource block pairs (PRB Pair for short).

204. The user equipment selects, in a transport block size table, a transport block size TBS corresponding to the quantity of physical resource pairs and corresponding to the determined first TBS index or second TBS index.

For example, the UE may select, in a layer 1 data transport block size table of LTE REL.8, a transport block size TBS 1256 corresponding to the quantity of physical resource block pairs, 8, determined in 203 and corresponding to the first TBS index 9 determined in 202.

For another example, the UE may select, in a layer 1 data transport block size table of LTE REL.8, a transport block size TBS 1384 corresponding to the quantity of physical resource block pairs, 8, determined in 203 and corresponding to the second TBS index 10 determined in 202.

205. Receive, by adopting the selected TBS, service data sent by the base station.

The user equipment decodes, according to the modulation mode determined in 202 and the TBS determined in 204, the received service data.

According to the data transmission method provided in this embodiment, a user equipment receives a system scheduling control signal sent by a base station, where the system scheduling control signal includes a modulation and coding level and a time-frequency resource; determines, in a first modulation and transport block size index table, a first transport block size TBS index and a first modulation mode that are corresponding to the modulation and coding level, or determines, in a second modulation and transport block size index table, a second TBS index and a second modulation mode that are corresponding to the modulation and coding level, where the second TBS index is not smaller than the first TBS index; determines a quantity of physical resource block pairs according to the time-frequency resource; selects, in a transport block size table, a transport block size TBS corresponding to the quantity of physical resource blocks and corresponding to the determined first TBS index or second TBS index; and receives, by adopting the selected TBS, service data sent by the base station. In this way, the user equipment can select a larger TBS corresponding to the modulation and coding level to receive the service data so as to achieve a higher coding rate and increase a system throughput.

Further, that the user equipment determines in a first modulation and transport block size index table, a first transport block size TBS index and a first modulation mode that are corresponding to the modulation and coding level, or determine, in a second modulation and transport block size index table, a second TBS index and a second modulation mode that are corresponding to the modulation and coding level includes that: the user equipment, according to a system configuration parameter or a system overhead size, determines, in the first modulation and transport block size index table, the first transport block size TBS index and the first modulation mode that are corresponding to the modulation and coding level, or determines, in the second modulation and transport block size index table, the second TBS index and the second modulation mode that are corresponding to the modulation and coding level.

For example, when the system configuration parameter indicates that a control signaling includes a physical downlink control channel, the UE chooses to determine, in the first modulation and transport block size index table, the first transport block size TBS index and the first modulation mode that are corresponding to the modulation and coding level; and when the system configuration parameter indicates that the control signaling does not include a physical downlink control channel, the UE chooses to determine, in the second modulation and transport block size index table, the second TBS index and the second modulation mode that are corresponding to the modulation and coding level.

Or, when the system overhead size is 48 resource elements, the UE chooses to determine, in the first modulation and transport block size index table, the first transport block size TBS index and the first modulation mode that are corresponding to the modulation and coding level; and when the system overhead size is 12 resource elements, the UE chooses to determine, in the second modulation and transport block size index table, the second TBS index and the second modulation mode that are corresponding to the modulation and coding level.

Further, the user equipment may also receive a high-layer signaling message sent by the base station, where the high-layer signaling message carries indication information of a selection to determine, in the first modulation and transport block size index table, the first transport block size TBS index and the first modulation mode that are corresponding to the modulation and coding level, or determine, in the second modulation and transport block size index table, the second TBS index and the second modulation mode that are corresponding to the modulation and coding level.

Further, the UE may further receive a downlink control message sent by the base station, where the downlink control message carries indication information of a selection to determine, in the first modulation and transport block size index table, the first transport block size TBS index and the first modulation mode that are corresponding to the modulation and coding level, or determine, in the second modulation and transport block size index table, the second TBS index and the second modulation mode that are corresponding to the modulation and coding level. By receiving, by the UE, the downlink control message which carries the indication information indicating whether the first modulation and transport block size index table or the second modulation and transport block size index table is selected, a speed of the user equipment in switching between the first modulation and transport block size index table and the second modulation and transport block size index table can be increased.

Further, the transport block size table may include layer 1 data transport block size table in a Long Term Evolution system release.8 LTE REL.8. The layer 1 data transport block size table in LTE REL.8 may be shown as the Table 1. For details, reference may be made to Table 1 and no further details are provided herein.

Further, the first modulation and transport block size index table may be a modulation and transport block size index table in LTE REL.8. The modulation and transport block size index table in LTE REL.8 is shown in Table 2. For details, reference may be made to Table 2 and no further details are provided herein.

Further, for the same modulation and coding level, if the second TBS index in the second modulation and transport block size index table is larger than the first TBS index in the first modulation and transport block size index table, a modulation order of the second modulation mode corresponding to the second TBS index is lower than a modulation order of the first modulation mode corresponding to the first TBS index.

Specifically, the second modulation and transport block size index table is shown in Table 3. For details, reference may be made to Table 3 and no further details are provided herein. For a correspondence among elements in the second modulation and transport block size index table in this embodiment, reference may be made to the explanation made in the foregoing embodiment and no further details is provided herein.

Persons of ordinary skill in the art can understand that all or a part of the steps to implement the foregoing method embodiments may be performed by a program instructing relevant hardware. The above-mentioned program may be stored in a computer readable storage medium, and when the program is executed, the steps of the foregoing method embodiments are performed. The above-mentioned storage medium includes various media capable of storing program code, such as a ROM, a RAM, a magnetic disk or an optical disc.

Figure 3:
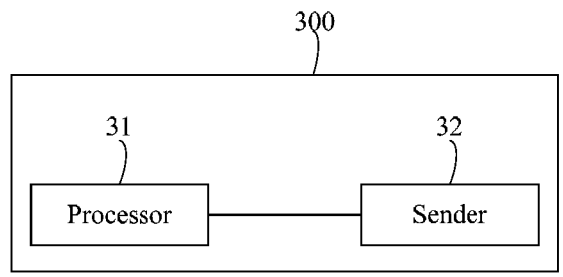
FIG. 3 is a schematic structural diagram of a first embodiment of a base station according to the present invention.

FIG. 3 is a schematic structural diagram of a first embodiment of a base station according to the present invention. As shown in FIG. 3, the base station 300 in this embodiment includes: a processor 31 and a sender 32. The processor 31 may be configured to determine a modulation and coding level; determine, in a first modulation and transport block size index table, a first transport block size TBS index and a first modulation mode that are corresponding to the modulation and coding level, or determine, in a second modulation and transport block size index table, a second TBS index and a second modulation mode that are corresponding to the modulation and coding level, where the second TBS index is not smaller than the first TBS index; and determine a time-frequency resource and determine, according to the time-frequency resource, a quantity of physical resource block pairs. The processor 31 may further be configured to select, in a transport block size table, a transport block size TBS corresponding to the quantity of physical resource block pairs and corresponding to the first TBS index or second TBS index. The sender 32 may be configured to send service data to a user equipment by adopting the selected TBS, and send a system scheduling control signal to the user equipment, where the system scheduling control signal includes the modulation and control level and the time-frequency resource.

In the base station in this embodiment, a processor determines a modulation and coding level; determines, in a first modulation and transport block size index table, a first transport block size TBS index and a first modulation mode that are corresponding to the modulation and coding level, or determines, in a second modulation and transport block size index table, a second TBS index and a second modulation mode that are corresponding to the modulation and coding level, where the second TBS index is not smaller than the first TBS index; determines a time-frequency resource, and determines, according to the time-frequency resource, a quantity of physical resource block pairs; and selects, in a transport block size table, a transport block size TBS corresponding to the quantity of physical resource blocks and corresponding to the determined first TBS index or second TBS index; and a sender sends service data to a user equipment by adopting the selected TBS; and sends a system scheduling control signal to the user equipment, where the system scheduling control signal includes the modulation and coding level and the time-frequency resource. In this way, the base station can select a larger TBS corresponding to the modulation and coding level so as to achieve a higher coding rate and increase a system throughout.

Further, the processor 31 may further be configured to, according to a system configuration parameter or a system overhead size, determine, in the first modulation and transport block size index table, the first transport block size TBS index and the first modulation mode that are corresponding to the modulation and coding level, or determine, in the second modulation and transport block size index table, the second TBS index and the second modulation mode that are corresponding to the modulation and coding level.

Further, the sender 32 may further be configured to send a high-layer signaling message to the user equipment, where the high-layer signaling message carries indication information of a selection to determine, in the first modulation and transport block size index table, the first transport block size TBS index and the first modulation mode that are corresponding to the modulation and coding level, or determine, in the second modulation and transport block size index table, the second TBS index and the second modulation mode that are corresponding to the modulation and coding level.

Further, the sender 32 may further be configured to send a downlink control message to the user equipment, where the downlink control message carries indication information of a selection to determine, in the first modulation and transport block size index table, the first transport block size TBS index and the first modulation mode that are corresponding to the modulation and coding level, or determine, in the second modulation and transport block size index table, the second TBS index and the second modulation mode that are corresponding to the modulation and coding level.

Further, the transport block size table may include a layer 1 data transport block size table in Long Term Evolution Release 8 LTE REL.8.

Further, the first modulation and transport block size index table may be a modulation and transport block size index table in LTE REL.8.

Further, for the same modulation and coding level, if the second TBS index in the second modulation and transport block size index table is larger than the first TBS index in the first modulation and transport block size index table, a modulation order of the second modulation mode corresponding to the second TBS index is lower than a modulation order of the first modulation mode corresponding to the first TBS index.

Figure 4:
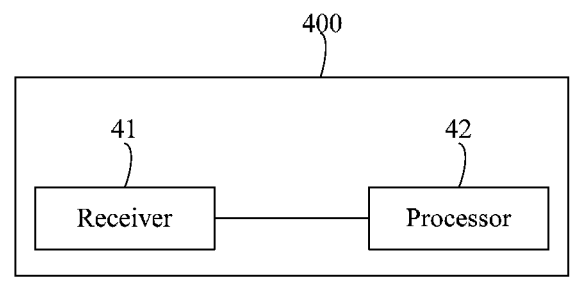
FIG. 4 is a schematic structural diagram of a first embodiment of a user equipment according to the present invention.

FIG. 4 is a schematic structural diagram of a first embodiment of a user equipment according to the present invention. As shown in FIG. 4, the user equipment 400 in this embodiment includes: a receiver 41 and a processor 42. The receiver 41 may be configured to receive a system scheduling control signal sent by a base station, where the system scheduling control signal includes a modulation and coding level and a time-frequency resource. The processor 42 may be configured to determine, in a first modulation and transport block size index table, a first transport block size TBS index and a first modulation mode that are corresponding to the modulation and coding level, or determine in a second modulation and transport block size index table, a second TBS index and a second modulation mode that are corresponding to the modulation and coding level, where the second TBS index is not smaller than the first TBS index; determine a quantity of physical resource block pairs according to the time-frequency resource; and select, in a transport block size table, a transport block size TBS corresponding to the quantity of physical resource block pairs and corresponding to the determined first TBS index or second TBS index. The receiver 41 may further be configured to receive, by adopting the selected TBS, service data sent by the base station.

In the user equipment in this embodiment, a receiver receives a system scheduling control signal sent by a base station, where the system scheduling control signal includes a modulation and coding level and a time-frequency resource; the processor determines, in a first modulation and transport block size index table, a first transport block size TBS index and a first modulation mode that are corresponding to the modulation and coding level, or determines in a second modulation and transport block size index table, a second TBS index and a second modulation mode that are corresponding to the modulation and coding level, where the second TBS index is not smaller than the first TBS index; the processor selects, in a transport block size table, a transport block size TBS corresponding to the quantity of physical resource blocks and corresponding to the determined first TBS index or second TBS index; and the receiver receives, by adopting the selected TBS, service data sent by the base station. In this way, the user equipment can select a larger TBS corresponding to the modulation and coding level to receive the service data so as to achieve a higher coding rate and increase a system throughout.

Further, the processor 42 may further be configured to, according to a system configuration parameter or a system overhead size, determine, in the first modulation and transport block size index table, the first transport block size TBS index and the first modulation mode that are corresponding to the modulation and coding level, or determine, in the second modulation and transport block size index table, the second TBS index and the second modulation mode that are corresponding to the modulation and coding level.

Further, the receiver 41 may be further configured to receive a high-layer signaling message sent by the base station, where the high-layer signaling message carries indication information of a selection to determine, in the first modulation and transport block size index table, the first transport block size TBS index and the first modulation mode that are corresponding to the modulation and coding level, or determine, in the second modulation and transport block size index table, the second TBS index and the second modulation mode that are corresponding to the modulation and coding level.

Further, the receiver 41 may further be configured to receive a downlink control message sent by the base station, where the downlink control message carries indication information of a selection to determine, in the first modulation and transport block size index table, the first transport block size TBS index and the first modulation mode that are corresponding to the modulation and coding level, or determine, in the second modulation and transport block size index table, the second TBS index and the second modulation mode that are corresponding to the modulation and coding level.

Further, the transport block size table may include a layer 1 data transport block size table in Long Term Evolution Release 8 LTE REL.8.

Further, the first modulation and transport block size index table may be a modulation and transport block size index table in LTE REL.8.

Further, for the same modulation and coding level, if the second TBS index in the second modulation and transport block size index table is larger than the first TBS index in the first modulation and transport block size index table, a modulation order of the second modulation mode corresponding to the second TBS index is lower than a modulation order of the first modulation mode corresponding to the first TBS index.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A data transmission method, comprising:
   determining, by a base station, a modulation and coding level;
   determining, by the base station, in a first modulation and transport block size (TBS) index table, a first TBS index and a first modulation mode that correspond to the modulation and coding level, or determining, by the base station, in a second modulation and TBS index table, a second TBS index and a second modulation mode that correspond to the modulation and coding level, wherein the second TBS index is larger than or equal to the first TBS index;
   determining, by the base station, a time-frequency resource, and determining, according to the time-frequency resource, a quantity of physical resource block pairs;
   selecting, by the base station in a TBS table, a TBS corresponding to one of (a) the quantity of physical resource pairs and (b) the determined first TBS index or the determined second TBS index;
   sending, by the base station, service data to a user equipment by adopting the selected TBS; and
   sending, by the base station, a system scheduling control signal to the user equipment, wherein the system scheduling control signal comprises the modulation and coding level and the time-frequency resource.

2. The method according to claim 1, wherein the determining, by the base station in the first modulation and TBS index table, the first TBS index and the first modulation mode, or determining, in the second modulation and TBS index table, the second TBS index and the second modulation mode further comprises:
   according to a system configuration parameter or a system overhead size, determining, by the base station in the first modulation and TBS index table, the first TBS index and the first modulation mode that correspond to the modulation and coding level, or determining, in the second modulation and TBS index table, the second TBS index and the second modulation mode that correspond to the modulation and coding level.

3. The method according to claim 1, further comprising:
   sending, by the base station, a high-layer signaling message to the user equipment, wherein the high-layer signaling message carries indication information of a selection to determine, in the first modulation and index table, the first TBS index and the first modulation mode that correspond to the modulation and coding level, or determine, in the second modulation and TBS index table, the second TBS index and the second modulation mode that correspond to the modulation and coding level.

4. The method according to claim 1, further comprising:
   sending, by the base station, a downlink control message to the user equipment, wherein the downlink control message carries indication information of a selection to determine, in the first modulation and TBS index table, the first TBS index and the first modulation mode that correspond to the modulation and coding level, or determine, in the second modulation and TBS index table, the second TBS index and the second modulation mode that correspond to the modulation and coding level.

5. The method according to claim 1, wherein the TBS table comprises a layer 1 data TBS table in Long Term Evolution Release 8 (LTE REL.8).

6. The method according to claim 1, wherein the first modulation and TBS index table is a modulation and TBS index table in Long Term Evolution Release 8 (LTE REL.8).

7. The method according to claim 6, wherein, for the same modulation and coding level, if the second TBS index in the second modulation and TBS index table is larger than the first TBS index in the first modulation and TBS index table, a modulation order of the second modulation mode corresponding to the second TBS index is lower than a modulation order of the first modulation mode corresponding to the first TBS index.

8. A data transmission method, comprising:
   receiving, by a user equipment, a system scheduling control signal sent by a base station, wherein the system scheduling control signal comprises a modulation and coding level and a time-frequency resource;
   determining, by the user equipment, in a first modulation and transport block size (TBS) index table, a first TBS index and a first modulation mode that correspond to the modulation and coding level, or determining, by the user equipment, in a second modulation and TBS index table, a second TBS index and a second modulation mode that correspond to the modulation and coding level, wherein the second TBS index is larger than or equal to the first TBS index;
   determining, by the user equipment, a quantity of physical resource block pairs according to the time-frequency resource; and
   selecting, by the user equipment in a TBS table, a TBS corresponding to one of (a) the quantity of physical resource pairs and (b) the determined first TBS index or the determined second TBS index; and receiving, by adopting the selected TBS, service data sent by the base station.

9. The method according to claim 8, wherein the determining, by the user equipment, in the first modulation and TBS index table, the first TBS index and the first modulation mode, or determining, in the second modulation and TBS index table, the second TBS index and the second modulation mode further comprises:
   according to a system configuration parameter or a system overhead size, determining, by the user equipment in the first modulation and TBS index table, the first TBS index and the first modulation mode that correspond to the modulation and coding level, or determining, in the second modulation and TBS index table, the second TBS index and the second modulation mode that correspond to the modulation and coding level.

10. The method according to claim 8, further comprising:
    receiving, by the user equipment, a high-layer signaling message sent by the base station, wherein the high-layer signaling message carries indication information of a selection to determine, in the first modulation and TBS index table, the first TBS index and the first modulation mode that correspond to the modulation and coding level, or determine, in the second modulation and TBS index table, the second TBS index and the second modulation mode that correspond to the modulation and coding level.

11. The method according to claim 8, further comprising:
    receiving, by the user equipment, a downlink control message sent by the base station, wherein the downlink control message carries indication information of a selection to determine, in the first modulation and TBS index table, the first TBS index and the first modulation mode that correspond to the modulation and coding level, or determine, in the second modulation and TBS index table, the second TBS index and the second modulation mode that correspond to the modulation and coding level.

12. The method according to claim 8, wherein the TBS table comprises a layer 1 data TBS table in Long Term Evolution Release 8 (LTE REL.8).

13. The method according to claim 8, wherein the first modulation and TBS index table is a modulation and TBS index table in Long Term Evolution Release (LTE REL.8).

14. The method according to claim 13, wherein, for the same modulation and coding level, if the second TBS index in the second modulation and TBS index table is larger than the first TBS index in the first modulation and TBS index table, a modulation order of the second modulation mode corresponding to the second TBS index is lower than a modulation order of the first modulation mode corresponding to the first TBS index.

15. A base station, comprising:
a processor, configured to determine a modulation and coding level; determine, in a first modulation and transport block size (TBS) index table, a first TBS index and a first modulation mode that correspond to the modulation and coding level, or determine, in a second modulation and TBS index table, a second TBS index and a second modulation mode that correspond to the modulation and coding level, wherein the second TBS index is larger than or equal to the first TBS index; and determine a time-frequency resource, and determine, according to the time-frequency resource, a quantity of physical resource block pairs;
wherein the processor is further configured to select, in a TBS table, a TBS corresponding to one of (a) the quantity of physical resource block pairs and (b) the determined first TBS index or the determined second TBS index; and
a sender, configured to send service data to a user equipment by adopting the selected TBS, and send a system scheduling control signal to the user equipment, wherein the system scheduling control signal comprises the modulation and control level and the time-frequency resource.

16. The base station according to claim 15, wherein the processor is further configured to, according to a system configuration parameter or a system overhead size, determine, in the first modulation and TBS index table, the first TBS index and the first modulation mode that correspond to the modulation and coding level, or determine, in the second modulation and TBS index table, the second TBS index and the second modulation mode that correspond to the modulation and coding level.

17. The base station according to claim 15, wherein the sender is further configured to send a high-layer signaling message to the user equipment, wherein the high-layer signaling message carries indication information of a selection to determine, in the first modulation and TBS index table, the first TBS index and the first modulation mode that correspond to the modulation and coding level, or determine, in the second modulation and TBS index table, the second TBS index and the second modulation mode that correspond to the modulation and coding level.

18. The base station according to claim 15, wherein the sender is further configured to send a downlink control message to the user equipment, wherein the downlink control message carries indication information of a selection to determine, in the first modulation and TBS index table, the first TBS index and the first modulation mode that correspond to the modulation and coding level, or determine, in the second modulation and index table, the second TBS index and the second modulation mode that correspond to the modulation and coding level.

19. The base station according to claim 15, wherein the TBS table comprises a layer 1 data TBS table in Long Term Evolution Release 8 (LTE REL.8).

20. The base station according to claim 15, wherein the first modulation and TBS index table is a modulation and TBS index table in Long Term Evolution Release 8 (LTE REL.8).

21. The base station according to claim 20, wherein, for the same modulation and coding level, if the second TBS index in the second modulation and TBS index table is larger than the first TBS index in the first modulation and TBS index table, a modulation order of the second modulation mode corresponding to the second TBS index is lower than a modulation order of the first modulation mode corresponding to the first TBS index.

22. A user equipment, comprising:
a receiver, configured to receive a system scheduling control signal sent by a base station, wherein the system scheduling control signal comprises a modulation and coding level and a time frequency resource; and
a processor, configured to determine, in a first modulation and transport block size (TBS) index table, a first TBS index and a first modulation mode that correspond to the modulation and coding level, or determine, in a second modulation and TBS index table, a second TBS index and a second modulation mode that correspond to the modulation and coding level, wherein the second TBS index is larger than or equal to the first TBS index; and determine a quantity of physical resource block pairs according to the time-frequency resource;
wherein the processor is further configured to select, in a TBS table, a TBS corresponding to one of (a) the quantity of physical resource blocks and (b) the determined first TBS index or the determined second TBS index; and
the receiver is further configured to receive, by adopting the selected TBS, service data sent by the base station.

23. The user equipment according to claim 22, wherein the processor is further configured to, according to a system configuration parameter or a system overhead size, determine, in the first modulation and TBS index table, the first TBS index and the first modulation mode that correspond to the modulation and coding level, or determine, in the second modulation and TBS index table, the second TBS index and the second modulation mode that correspond to the modulation and coding level.

24. The user equipment according to claim 22, wherein the receiver is further configured to receive a high-layer signaling message sent by the base station, wherein the high-layer signaling message carries indication information of a selection to determine, in the first modulation and TBS index table, the first TBS index and the first modulation mode that correspond to the modulation and coding level, or determine, in the second modulation and TBS index table, the second TBS index and the second modulation mode that correspond to the modulation and coding level.

25. The user equipment according to claim 22, wherein the receiver is further configured to receive a downlink control message sent by the base station, wherein the downlink control message carries indication information of a selection to determine, in the first modulation and TBS index table, the first TBS index and the first modulation mode that correspond to the modulation and coding level, or determine, in the second modulation and TBS index table, the second TBS index and the second modulation mode that correspond to the modulation and coding level.

26. The user equipment according to claim 22, wherein the TBS table comprises a layer 1 data TBS table in Long Term Evolution Release 8 (LTE REL.8).

27. The user equipment according to claim 22, wherein the first modulation and TBS index table is a modulation and TBS index table in Long Term Evolution Release 8 (LTE REL.8).

28. The user equipment according to claim 27, wherein, for the same modulation and coding level, if the second TBS index in the second modulation and TBS index table is larger than the first TBS index in the first modulation and TBS index table, a modulation order of the second modulation mode corresponding to the second TBS index is lower than a modulation order of the first modulation mode corresponding to the first TBS index.

* * * * *